US007628699B2

(12) United States Patent
Onoda et al.

(10) Patent No.: US 7,628,699 B2
(45) Date of Patent: *Dec. 8, 2009

(54) PROGRAM, INFORMATION STORAGE MEDIUM, GAME SYSTEM, AND CONTROL METHOD OF THE GAME SYSTEM

(75) Inventors: Hiroyuki Onoda, Yokohama (JP); Hiroumi Endo, Tokyo (JP); Hiroshi Igarashi, Yokohama (JP); Junji Takamoto, Kyoto (JP); Takeshi Nagareda, Kyoto (JP)

(73) Assignees: Namco Bandai Games Inc., Tokyo (JP); Nintendo Co., Ltd., Kyoto (JP)

( * ) Notice: Subject to any disclaimer, the term of this patent is extended or adjusted under 35 U.S.C. 154(b) by 782 days.

This patent is subject to a terminal disclaimer.

(21) Appl. No.: 10/935,181

(22) Filed: Sep. 8, 2004

(65) Prior Publication Data

US 2005/0101364 A1    May 12, 2005

(30) Foreign Application Priority Data

Sep. 12, 2003    (JP)    ............................. 2003-321960

(51) Int. Cl.
*A63F 13/00*    (2006.01)

(52) U.S. Cl. .............................. 463/36; 463/37; 463/40; 463/46

(58) Field of Classification Search ...................... 463/7, 463/36, 37, 40, 46
See application file for complete search history.

(56) References Cited

U.S. PATENT DOCUMENTS

| 6,227,968 | B1 * | 5/2001 | Suzuki et al. .................. 463/7 |
| 6,347,998 | B1 | 2/2002 | Yoshitomi et al. |
| 6,379,244 | B1 | 4/2002 | Sagawa et al. |
| 6,634,886 | B2 | 10/2003 | Oyama et al. |
| 6,645,067 | B1 * | 11/2003 | Okita et al. .................... 463/7 |
| 2005/0085297 | A1 * | 4/2005 | Onoda et al. .................. 463/37 |

FOREIGN PATENT DOCUMENTS

| JP | A-56-148368 | 11/1981 |
| JP | A-11-151380 | 6/1999 |
| JP | A-2001-9152 | 1/2001 |
| JP | A-2001-070636 | 3/2001 |
| JP | 2001-212369 A | 8/2001 |
| JP | A-2001-232057 | 8/2001 |

(Continued)

OTHER PUBLICATIONS

U.S. Appl. No. 10/936,592, filed Sep. 9, 2004, Hiroyuki Onoda et al.
U.S. Appl. No. 10/936,589, filed Sep. 9, 2004, Hiroyuki Onoda et al.
U.S. Appl. No. 10/936,579, filed Sep. 9, 2004, Hiroyuki Onoda et al.

*Primary Examiner*—John M Hotaling, II
*Assistant Examiner*—Jeffrey Wong
(74) *Attorney, Agent, or Firm*—Oliff & Berridge, PLC

(57) ABSTRACT

A game system includes: a direction mark storage section which stores image data of a direction mark that specifies a player's maneuver; a display controller which controls display of a plurality of display objects including the direction mark; a timing fetch section which fetches a maneuver timing; and an evaluation section which evaluates player's performance, based on a result of comparison between the fetched maneuver timing and a reference timing. The display controller displays the direction mark to specify a combination of a series of consecutive maneuvers by a single mark. When the player has input a series of consecutive maneuvers in accordance with a direction of the direction mark, the evaluation section compares the timing of the series of consecutive maneuvers with a reference timing, to evaluate the performance of the player.

16 Claims, 15 Drawing Sheets

FOREIGN PATENT DOCUMENTS

| | | |
|---|---|---|
| JP | A-2001-314650 | 11/2001 |
| JP | A-2001-321564 | 11/2001 |
| JP | A-2002-239233 | 8/2002 |
| JP | A-2002-301263 | 10/2002 |
| JP | A-2003-117233 | 4/2003 |
| JP | U-3098422 | 10/2003 |

* cited by examiner

| DIRECTION MARK | CONSECUTIVE MANEUVERS COMBINATION |
|---|---|
| ○ | A B A B |
| △ | A B C D |
| □ | A C A C A C |
| ┆ | ┆ |

FIG. 6

| DIRECTION MARK | CONSECUTIVE MANEUVERS COMBINATION | EVALUATION DATA | MANEUVER SOUND MODIFICATION DATA |
|---|---|---|---|
| ○ | A B A B | INPUT-SUCCESSFUL POINTS: 100 | INCREASE VOLUME IN SECOND HALF OF MELODY |
| △ | A B C D | INPUT-SUCCESSFUL POINTS: 80 | INCREASE PITCH IN SECOND HALF OF MELODY |
| □ | A C A C A C | INPUT-SUCCESSFUL POINTS: 60 | INCREASE VOLUME IN MELODY M1 AND INCREASE PITCH IN MELODY M2 |
| -------- | -------- | -------- | -------- |

PROGRAM, INFORMATION STORAGE MEDIUM, GAME SYSTEM, AND CONTROL METHOD OF THE GAME SYSTEM

Japanese Patent Application No. 2003-321960, filed on Sep. 12, 2003, is hereby incorporated by reference in its entirety.

BACKGROUND OF THE INVENTION

The present invention relates from a sound output section and also direction marks (reference symbols) for indicating the timing of the player's maneuvers are displayed on a display to a program, an information storage medium, a game system, and a control method of the game system.

Game systems that enable a player to play a music game are known in the art. In such a game system, music is output section. The player enjoys the music game by performing maneuvers in accordance with the displayed direction marks, while listening to the music that is output therefrom.

With this prior-art music game system, however, one direction mark can specify only one maneuver. It is therefore necessary to display a plurality of direction marks in order to specify a combination of a series of consecutive maneuvers to the player. To direct the player to input first to fourth maneuvers in sequence, for example, it is necessary to display first to fourth direction marks indicating those first to fourth maneuvers together in a direction mark display region on the screen.

However, the area of the direction mark display region is limited. There is therefore a limit on the combined display of a large number of direction marks to direct a series of consecutive maneuvers. For that reason, it is only possible to specify about two consecutive maneuvers, such as directions for first and second maneuvers in sequence.

BRIEF SUMMARY OF THE INVENTION

According to a first aspect of the present invention, there is provided a program for a music game which a player plays by operating a maneuver section, the program causing a computer to function as:

a direction mark storage section which stores image data of a direction mark that specifies a maneuver that the player is to perform, using the maneuver section;

a display controller which controls display of a plurality of display objects including the direction mark, based on the image data of the direction mark;

a timing fetch section which fetches a maneuver timing when the player has operated the maneuver section in accordance with a direction given by the direction mark; and an evaluation section which evaluates performance of the player, based on a result of comparison between the fetched maneuver timing and a reference timing, wherein the display controller displays the direction mark to specify a combination of a series of consecutive maneuvers to be input by the player, by a single mark; and wherein the display controller changes the relative positional relationship between the direction mark and a reference position for timing determination to bring the direction mark and the reference position closer.

According to a second aspect of the present invention, there is provided a program for a percussion-instrument game in which a player strikes a percussion-instrument-shaped controller, the program causing a computer to function as:

a direction mark storage section which stores image data of a direction mark that specifies a striking maneuver that the player is to perform, using a percussion-instrument-shaped controller;

a display controller which controls display of a plurality of display objects including the direction mark, based on the image data of the direction mark;

a timing fetch section which fetches a strike timing when the player has struck the percussion-instrument-shaped controller in accordance with a direction given by the direction mark; and an evaluation section which evaluates performance of the player, based on a result of comparison between the fetched strike timing and a reference timing, wherein the display controller displays the direction mark to specify a combination of a series of consecutive maneuvers to be input by the player, by a single mark; and wherein the display controller changes the relative positional relationship between the direction mark and a reference position for timing determination to bring the direction mark and the reference position closer.

According to a third aspect of the present invention, there is provided a computer-readable information storage medium storing any of the above program.

According to a fourth aspect of the present invention, there is provided a game system for a music game which a player plays by operating a maneuver section, the game system comprising:

a direction mark storage section which stores image data of a direction mark that specifies a maneuver that the player is to perform, using the maneuver section;

a display controller which controls display of a plurality of display objects including the direction mark, based on the image data of the direction mark;

a timing fetch section which fetches a maneuver timing when the player has operated the maneuver section in accordance with a direction given by the direction mark; and an evaluation section which evaluates performance of the player, based on a result of comparison between the fetched maneuver timing and a reference timing, wherein the display controller displays the direction mark to specify a combination of a series of consecutive maneuvers to be input by the player, by a single mark; and wherein the display controller changes the relative positional relationship between the direction mark and a reference position for timing determination to bring the direction mark and the reference position closer.

According to a fifth aspect of the present invention, there is provided a game system for a percussion-instrument game in which a player strikes a percussion-instrument-shaped controller, the game system comprising:

a direction mark storage section which stores image data of a direction mark that specifies a striking maneuver that the player is to perform, using a percussion-instrument-shaped controller;

a display controller which controls display of a plurality of display objects including the direction mark, based on the image data of the direction mark;

a timing fetch section which fetches a strike timing when the player has struck the percussion-instrument-shaped controller in accordance with a direction given by the direction mark; and an evaluation section which evaluates performance of the player, based on a result of comparison between the fetched strike timing and a reference timing, wherein the display controller displays the direction mark to specify a combination of a series of consecutive maneuvers to be input by the player, by a single mark; and wherein the display controller changes the relative positional relationship between the direction mark and a reference position for timing determination to bring the direction mark and the reference position closer.

According to a sixth aspect of the present invention, there is provided a method of controlling a game system for a music game which a player plays by operating a maneuver section, the method comprising:

storing image data of a direction mark that specifies a maneuver that the player is to perform, using the maneuver section, in a direction mark storage section;

controlling display of a plurality of display objects including the direction mark, based on the image data of the direction mark;

fetching a maneuver timing when the player has operated the maneuver section in accordance with a direction given by the direction mark;

evaluating performance of the player, based on a result of comparison between the fetched maneuver timing and a reference timing;

displaying the direction mark to specify a combination of a series of consecutive maneuvers to be input by the player, by a single mark; and changing the relative positional relationship between the direction mark and a reference position for timing determination to bring the direction mark and the reference position closer.

According to a seventh aspect of the present invention, there is provided a method of controlling a game system for a percussion-instrument game in which a player strikes a percussion-instrument-shaped controller, the method comprising:

storing image data of a direction mark that specifies a striking maneuver that the player is to perform, using a percussion-instrument-shaped controller, in a direction mark storage section;

controlling display of a plurality of display objects including the direction mark, based on the image data of the direction mark;

fetching a strike timing when the player has struck the percussion-instrument-shaped controller in accordance with a direction given by the direction mark;

evaluating performance of the player, based on a result of comparison between the fetched strike timing and a reference timing;

displaying the direction mark to specify a combination of a series of consecutive maneuvers to be input by the player, by a single mark; and changing the relative positional relationship between the direction mark and a reference position for timing determination to bring the direction mark and the reference position closer.

BRIEF DESCRIPTION OF THE SEVERAL VIEWS OF THE DRAWING

FIG. 6 shows table data used in evaluation according to one embodiment of the present invention.

DETAILED DESCRIPTION OF THE EMBODIMENTS

Figure 1:
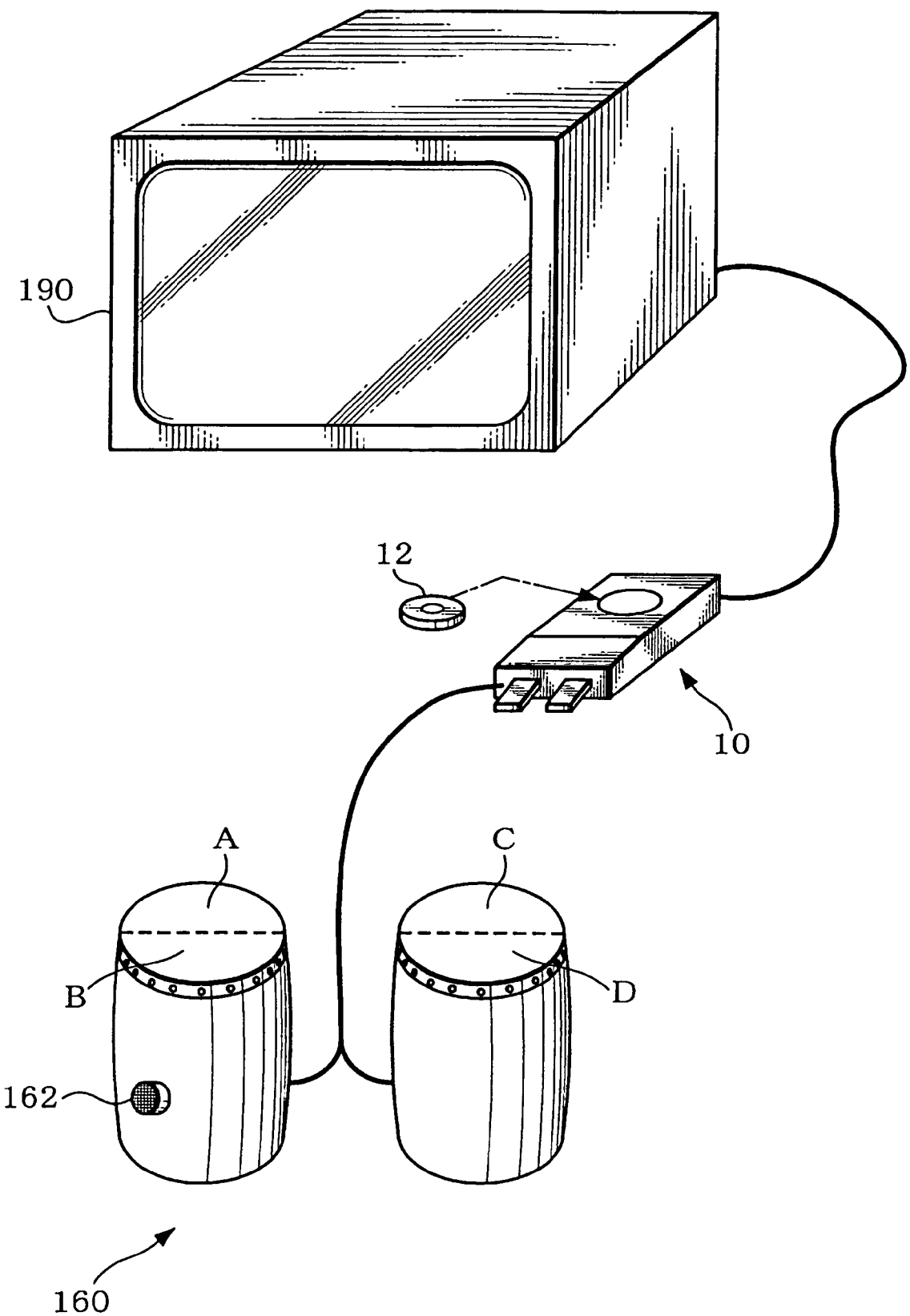
FIG. 1 shows a game system according to one embodiment of the present invention.

The present invention was devised in the light of the above-described technical problems, and the present invention may implement a program, an information storage medium, a game system, and a control method of the game system that make it possible to simplify the specification of a series of consecutive maneuvers.

According to one embodiment of the present invention, there is provided a game system for a music game which a player plays by operating a maneuver section, the game system comprising:

a direction mark storage section which stores image data of a direction mark that specifies a maneuver that the player is to perform, using the maneuver section;

a display controller which controls display of a plurality of display objects including the direction mark, based on the image data of the direction mark;

a timing fetch section which fetches a maneuver timing when the player has operated the maneuver section in accordance with a direction given by the direction mark; and an evaluation section which evaluates performance of the player, based on a result of comparison between the fetched maneuver timing and a reference timing, wherein the display controller displays the direction mark to specify a combination of a series of consecutive maneuvers to be input by the player, by a single mark; and wherein the display controller changes the relative positional relationship between the direction mark and a reference position for timing determination to bring the direction mark and the reference position closer.

According to another embodiment of the present invention, there is provided a program causing a computer to function as the above-described components. According to a further embodiment of the present invention, there is provided a computer-readable information storage medium storing (or recording) a program which causes a computer to function as the above-described components.

These embodiments control the display of a direction mark that specifies a combination of a series of consecutive maneuvers that the player is supposed to input, by a single mark. The relative positional relationship between this direction mark and a reference position (reference mark) for determining timing is made to change, and the display is controlled so that the direction mark and the reference position become closer. A series of consecutive maneuvers can be thus specified by a single mark. It is therefore possible to specify consecutive maneuvers with direction marks that take up an areas that are substantially the same, regardless of the number of times the consecutive maneuvers are performed. This makes it possible to ask the player to perform a rich range of maneuvers, while using a direction mark display region of a limited area, and to increase enjoyment of the game.

In each of the game system, program, information storage medium and control method of the game system, when the player has input a series of consecutive maneuvers in accordance with the direction of the direction mark, the evaluation section may compare a timing of the series of the consecutive maneuvers with a reference timing, to evaluate the performance of the player.

In each of the game system, program, information storage medium and control method of the game system, the display controller may display a first direction mark to specify input of a first series of consecutive maneuvers, and display a second direction mark that differs from the first direction mark to specify input of a second series of consecutive maneuvers; and when the player has input the first series of consecutive maneuvers in accordance with the first direction mark, the evaluation section may compare the timing of the first series of consecutive maneuvers with a first reference timing, to evaluate the performance of the player, and when the player has input the second series of consecutive maneuvers in accordance with the second direction mark, the evaluation section may compare the timing of the second series of consecutive maneuvers with a second reference timing, to evaluate the performance of the player. This makes it possible to specify the input of a first combination of consecutive maneuvers by the first direction mark and a second combination of consecutive maneuvers by the second direction mark, so that the player can be asked to perform a richer variety of maneuvers.

In each of the game system, program, information storage medium and control method of the game system, the display controller may control the display of the direction mark in such a manner that the reference position for timing determination is positioned within the direction mark at both a timing at which a series of consecutive maneuvers specified by the direction mark is to start and a timing at which the series of consecutive maneuvers is to end. In each of the game system, program, information storage medium and control method of the game system, the display controller may halt the movement of at least one of the reference position and the direction mark in an input reception time in which input of a series of consecutive maneuvers specified by the direction mark is received. This enables the player to properly input consecutive maneuvers that require a fixed time for input, as well as enabling the player to recognize the timings for the start and end of the consecutive maneuvers, in a simple manner.

In each of the game system, program, information storage medium and control method of the game system, the display controller may display a guide mark which is used to inform the player of the input reception time. This makes it possible for the player to grasp details such as the start, passage, or end of the time in which the input of the consecutive maneuvers is received, by viewing these guide marks, thus making it possible to improve the player's performance interface environment.

In the game system, program, information storage medium and control method of the game system, the display controller may display the direction mark so as to specify a plurality of repeats of a series of consecutive maneuvers; and when the player has input a plurality of repeats of a series of consecutive maneuvers in accordance with the direction mark, the evaluation section may compare a timing of the consecutive maneuvers performed a plurality of times with the reference timing. This makes it possible to ask the player to perform more advanced maneuvers, by simple control over the display of the direction marks, enabling an increase in the enjoyment of the game.

Each of the game system and control method of the game system may further comprise a maneuver sound modification section which modifies a maneuver sound that is output in response to consecutive maneuvers that the player has input, in accordance with a game status. Each of the program and information storage medium may cause the computer to further function as a maneuver sound modification section which modifies a maneuver sound that is output in response to consecutive maneuvers that the player has input, in accordance with a game status. In this game system, program, information storage medium and control method of the game system, the maneuver sound modification section may modify the maneuver sound that is output in response to consecutive maneuvers that the player has input, based on at least one of the degree of game progress and a melody that is selected in the game. This makes it possible to increase the amount of variety in the maneuver sounds that are output, thus improving the production effects of the music game.

Each of the game system and control method of the game system may further comprise an allocation modification section which performs processing to modify a combination of consecutive maneuvers that is allocated to the direction mark. Each of the program and information storage medium may cause the computer to further function as an allocation modification section which performs processing to modify a combination of consecutive maneuvers that is allocated to the direction mark. This makes it possible to increase the amount of variety of maneuver inputs in the music game.

In this game system, program, information storage medium and control method of the game system, the display controller may display a first direction mark that specifies to the player a maneuver to be performed by using the maneuver section and a second direction mark that specifies to the player a sound input maneuver to be detected by a sound detection section; and when the timing fetch section judges that the player has operated both the maneuver section and the sound input maneuver within a given period, the timing fetch section may determine that the operation of the maneuver section is valid and fetch a maneuver timing of the operation of the maneuver section, but when the timing fetch section judges that the player has not operated the maneuver section and the sound input maneuver within the same period, the timing fetch section may determine that both the operation of the maneuver section and the sound input maneuver are valid and fetch maneuver timings of both the operation of the maneuver section and the sound input maneuver.

When the first direction mark and the second direction mark are displayed, and the player performs an operation of the maneuver section or a sound input maneuver that corresponds to the type of direction mark that is displayed. The first direction mark specifies that the player performs an operation of the maneuver section (other than the sound input maneuver section) and the second direction mark specifies that the player performs a sound input maneuver that is to be detected by the sound detection section. A sound input maneuver (sound input action) could be any action as long as a player's action produce a sound, such as a speech action, a time-beating action, or a strike sound generation action caused by striking an object (such as an action that generates a sound from a percussion instrument), or a vibration sound generation caused by the vibration of an object (such as an action that generates a sound from a stringed instrument).

If the system judges that the player has operated both the maneuver section and the sound input maneuver within a given period (such as if the operation of the maneuver section and the sound input maneuver are received overlapping within the input reception period for the same direction mark), it determines that the operation of the maneuver section (or input data from the maneuver section) is the valid data. In such a case, the system judges that the player has operated the maneuver section but it is highly likely that the corresponding maneuver sound has been detected erroneously by the sound detection section. In addition, the operation of the maneuver section is determined to be the required operation and errors such as erroneous input from the sound detection section are prevented, and also the operation of the maneuver section is detected accurately.

In all other cases (such as if the system has judged there is no overlap or it judges that the player has operated the maneuver section and the sound input maneuver in different periods), the system judges that the probability of erroneous input is low and thus both the operation of the maneuver section and the sound input maneuver are valid. Therefore, the operation of the maneuver section and the sound input maneuver can be detected accurately, even if the configuration is such that there are different types of input operations such as those from the maneuver section and sound input maneuvers.

Note that "the operation is valid" means that the data that is input by that operation is data that can be used in game computations (such as processing for fetching maneuver timing or processing for evaluating a maneuver or a sound input maneuver). In other words, this is data from a maneuver or a sound input maneuver that the player intended to perform. In other words, "the operation is invalid" means that the input that is input by that operation is data for an operation that the player did not intend to perform (an erroneous input operation), which is not to be used in the game computations.

According to one embodiment of the present invention, there is provided a game system for a percussion-instrument game in which a player strikes a percussion-instrument-shaped controller, the game system comprising:

a direction mark storage section which stores image data of a direction mark that specifies a striking maneuver that the player is to perform, using a percussion-instrument-shaped controller;

a display controller which controls display of a plurality of display objects including the direction mark, based on the image data of the direction mark;

a timing fetch section which fetches a strike timing when the player has struck the percussion-instrument-shaped controller in accordance with a direction given by the direction mark; and an evaluation section which evaluates performance of the player, based on a result of comparison between the fetched strike timing and a reference timing, wherein the display controller displays the direction mark to specify a combination of a series of consecutive maneuvers to be input by the player, by a single mark; and wherein the display controller changes the relative positional relationship between the direction mark and a reference position for timing determination to bring the direction mark and the reference position closer.

According to another embodiment of the present invention, there is provided a program causing a computer to function as the above-described components. According to a further embodiment of the present invention, there is provided a computer-readable information storage medium storing (or recording) a program which causes a computer to function as the above-described components.

With this embodiment, a series of consecutive maneuvers is specified by using one direction mark, and the performance of the player is evaluated. It is therefore possible to specify a plurality of striking maneuvers in sequence, in a manner that is easy for the player to understand, enabling an improvement in the player's performance interface environment in a percussion-instrument game.

These embodiments will be described in detail below. Note that the following embodiments described below do not in any way limit the scope of the invention laid out in the claims herein. In addition, not all of the elements of the embodiments described below should be taken as essential requirements of the present invention.

1. Configuration

FIG. 1 shows a game system according to one embodiment of the present invention. This game system includes a maneuver section 160 that is in the shape of a percussion instrument such as a pair of drums (a percussion-instrument-shaped controller), a main unit 10 (a game device or image generation device), and a display section 190. It also includes a sound detection section 162 (such as a microphone) for detecting ambient sounds. If this sound detection section 162 detects a sound, it outputs it to the main unit 10 as either analog data or digital data after A/D conversion.

The maneuver section 160 has maneuver areas A, B, C, D (generally speaking: a plurality of maneuver areas), such that the player uses the left hand to strike maneuver areas (strike areas) A and B on the left side and the right hand to strike maneuver areas (strike areas) C and D on the right side. A sensor (not shown in the figure) is provided within the maneuver section 160 to correspond to each of these maneuver areas A, B, C, D, and these sensors can be used to detect which of the maneuver areas A, B, C, D has been operated. When a maneuver area is operated, a maneuver sound (the sound of the musical instrument being played) that is linked to that maneuver area is output from a sound output section.

The main unit 10 performs processing to generate game images and game sounds, based on maneuver data from the maneuver section 160, sound detection data from the sound detection section 162, and a program stored in an information storage medium 12 (such as a CD or DVD). The thus-generated game images are displayed on the display section 190 and the thus-generated game sounds (music) are output from the sound output section (a speaker) of the display section 190. In this case, maneuver data obtained from operation of each of the maneuver areas A, B, C, D is input to the main unit 10 and the game processing is based on that maneuver data.

Note that although the maneuver section 160 and the main unit 10 are provided separately in FIG. 1, the configuration could also be such that the main unit 10 (game processing section, image generation section, and sound generation section) is provided within the maneuver section 160. In such a configuration, the maneuver section 160 (game controller) would be connected directly to the display section 190 and games sounds would be output from the sound output section of the display section 190.

In addition, although the example given in FIG. 1 relates to a domestic game device, the present invention can also be applied to an arcade game device. In addition, although there are four maneuver areas (maneuver sections) in FIG. 1, two, three, five, or even more maneuver areas could be provided instead. Similarly, although the maneuver section 160 is shown divided into left-side and right-side members in FIG. 1, these could also be a single undivided maneuver section.

Figure 2:
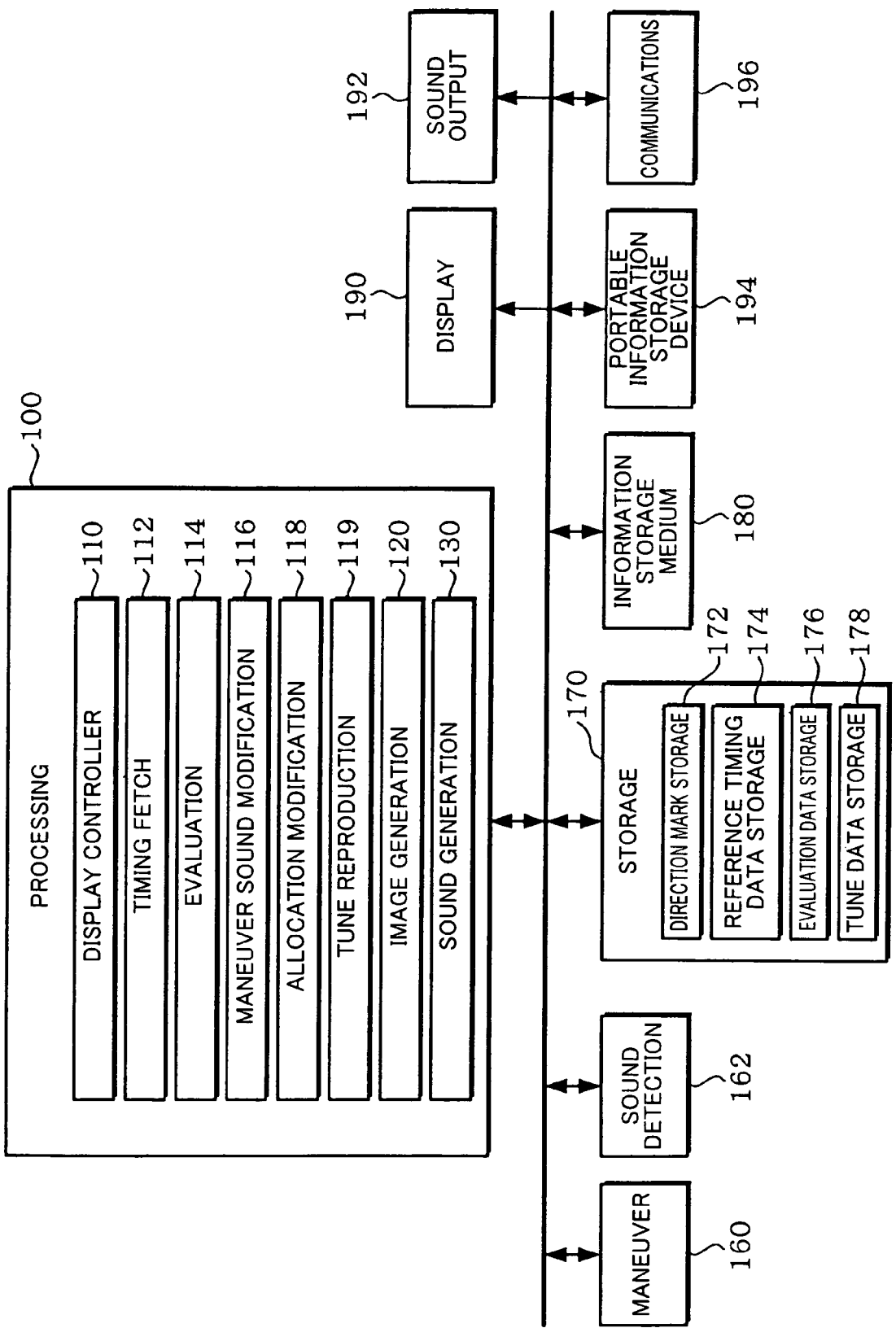
FIG. 2 is a functional block diagram of the game system according to one embodiment of the present invention.

A functional block diagram of a game system (image generation system) in accordance with an embodiment of the present invention is shown in FIG. 2. Note that the game system of this embodiment does not necessarily include all of the structural elements (components) shown in FIG. 2, and thus some of them could be omitted. In addition, the music game implemented by the game system (program) of this embodiment could be a game that enables the performance of music from a maneuver section shaped like a musical instrument (musical instrument type of controller), or it could be a dance game in which the user dances to music.

The maneuver section 160 is designed to enable the player to input maneuver data, and the functions thereof can be implemented by hardware such as a percussion-instrument-shaped controller (generally speaking: a musical instrument), operating buttons, operating levers, or a dance stage if this is a dancing music game.

The sound detection section 162 can be implemented by hardware such as a microphone for inputting sounds. Note that components such as an A/D converter for converting analog sound data into digital sound data and a processor (circuitry) for performing various different processes on the sound data could also be included within the sound detection section 162.

A storage section 170 forms a work area for components such as a processing section 100 and a communications section 196, and the functions thereof can be implemented by hardware such as RAM.

An information storage medium 180 (a medium that can be read by a computer) holds information such as a program and data, and the functions thereof can be implemented by an optical disk (CD or DVD), a magneto-optical disk (MO), a magnetic disk, a hard disk, magnetic tape, or memory (ROM). The processing section 100 bases the execution of the various different processes of this embodiment on the program (data) stored in this information storage medium 180. In other words, a program that causes a computer to function as the various components of this embodiment (a program for performing various processing in a computer) is stored in the information storage medium 180.

The display section 190 is designed to output the images generated by this embodiment, and the functions thereof can be implemented by hardware such as a CRT, LCD panel, touch-panel display, or head-mounted display (HMD). A sound output section 192 is designed to output the sounds generated by this embodiment, and the functions thereof can be implemented by hardware such as a speaker or headphones. A portable information storage device 194 stores data such as a player's personal data and saved game data, and various devices such as a memory card or a portable game machine could be used as this portable information storage device 194. The communications section 196 provides various types of control for communicating with an external device (such as a host device or another game system), and the functions thereof can be implemented by hardware such as various types of processor or a communications ASIC, or by a program.

Note that a program (data) for causing a computer to function as the various sections of this embodiment could be distributed to the information storage medium 180 (the storage section 170) from an information storage medium possessed by a host device (server), through a network and the communications section 196. Such use of an information storage medium on the host device (server) is also included within the scope of the present invention.

The processing section 100 (processor) performs various types of processing, such as game processing, image generation processing, or sound generation processing, based on maneuver data from the maneuver section 160, or sound detection data from the sound detection section 162, or a program. The game processing in such a case includes processing such as that for starting the game if certain game start conditions have been satisfied, processing for moving the game forward, processing for disposing display objects such as direction marks and characters, processing for displaying the display objects, processing for calculating game results, or processing for ending the game if certain game start conditions have been satisfied. The processing section 100 performs the various processes while using the storage section 170 as a work area. The functions of this processing section 100 can be implemented by hardware such as various different processors (such as a CPU or DSP) or an ASIC (gate array), or by a program (game program).

The processing section 100 includes a display controller 110, a timing fetch section 112, an evaluation section 114, a maneuver sound modification section 116, an allocation modification section 118, a tune reproduction section 119, an image generation section 120, and a sound generation section 130. Note that some of these components could be omitted.

The display controller 110 controls the display of a plurality of display objects, including direction marks (reference symbols). More specifically, it executes processing such as that to dispose display objects, move the display objects, or modify the images of the display objects. In this case, a direction mark is a mark for specifying a maneuver that the player should perform, using the maneuver section 160. Image data therefore is stored in a direction mark storage section 172 of the storage section 170.

The display controller 110 controls the display of a first direction mark that specifies that the player is to perform a maneuver using the maneuver section 160 and a second direction mark that specifies that the player performs a sound input maneuver that is to be detected by the sound detection section 162.

When the player uses the maneuver section 160 in accordance with the specification of a direction mark (when the player plays the percussion instrument), the timing fetch section 112 performs processing to fetch the timing of that operation. More specifically, it monitors and fetches maneuver data from the maneuver section 160 at each frame. It then performs processing to accumulate and store the thus-fetched maneuver data in a given storage buffer. Note that a frame (such as 1/60 second or 1/30 second) is the unit of time used for game processing (such as object movement or action processing) and image generation processing.

If it is judged that there is an overlap within a given period between a maneuver of the maneuver section 160 by the player and a sound input maneuver (sound input action) of the player detected by the sound detection section 162, the timing fetch section 112 determines whether the operation of the maneuver section 160 is valid. It then executes processing to fetch the timing of the operation that was determined to be valid. In all other cases (if it is judged that there is no overlap), it determines that each of the operation of the maneuver section 160 and the sound input maneuver is valid. It then executes processing to fetch the timing of each operation that was determined to be valid.

The evaluation section 114 compares the fetched maneuver timing with a reference timing, and evaluates the performance of the player, based on the determination result. More specifically, reference timing that acts as a model is stored in a reference timing data storage section 174 of the storage section 170. The evaluation section 114 reads out the thus-stored reference timing data, and performs processing to determine that the fetched maneuver timing and the reference timing match, or processing to determine how much the maneuver timing and the reference timing are out of sync. The evaluation section 114 bases evaluation on evaluation data (special data for evaluation reference) that is stored in an evaluation data storage section 176.

In this embodiment, the display controller 110 controls the display of direction marks that can specify a combination of a series of consecutive maneuvers to be input by the player (a series of first to Nth operations to be input in sequence). When the series of consecutive maneuvers (first to Nth operations) specified by this direction mark has been input, the evaluation section 114 compares the timing of the thus-input series of consecutive maneuvers (such as the operation sequence or operation time interval) and a reference timing, to evaluate the player's operation and calculate the score of the player. Note that the series of consecutive maneuvers specified by the direction mark can include a plurality of operations with respect to different maneuver areas (the maneuver areas A to D of FIG. 1), such as a maneuver with respect to the maneuver area A and a maneuver with respect to the maneuver area B.

The maneuver sound modification section 116 performs processing to modify details of the maneuver sound that is output to correspond to the input consecutive maneuvers, in accordance with the game status (such as the degree of game progress or the melody that is being played). This maneuver sound modification processing can be implemented by modifying score data (such as data determining sound volume, pitch, and tone) that is stored linked to a combination of consecutive maneuvers or each operation.

The allocation modification section 118 performs processing to modify the combination that is to be allocated to a direction mark. This allocation modification processing can be implemented by modifying a combination of consecutive maneuvers that is linked to a direction mark, for example, in accordance with a factor such as a selection by the player.

The tune reproduction section 119 performs processing to reproduce tune data for the music game that is implemented by this embodiment. More specifically, it performs processing to read out tune data (generally speaking: music data) that is stored in the tune data storage section 178, for output by the sound output section 192. The display controller 110 performs processing for controlling the display of direction marks so as to be linked to this reproduction of tune data. In this case, the display in which a direction mark is linked to the reproduction of tune data is such that the reproduction of the tune data (output of music data) starts and also the movement of the various direction marks and the reference position (reference mark) starts, and the movement display ends together with the end of reproduction of the tune data, by way of example. More specifically, it is a correspondence between the display timing of the various direction marks and the sound reproduction timing for the tune data.

The image generation section 120 performs drawing processing based on the results of various different processes executed by the processing section 100, to generate images for output to the display section 190. The sound generation section 130 performs sound processing based on the results of various different processes performed by the processing section 100, to generate game sounds such as background music, sound effects, and voices for output to the sound output section 192.

Note also that the simulation system of this embodiment could be applied to a system provided with a dedicated single-player mode, which enables one player to play the game, or it could also be applied to a system provided with a multi-player mode, which enables a plurality of players to play. If a plurality of players are playing, the game images and game sounds supplied to this plurality of players could be created by using one terminal, or they could be created by using a plurality of terminals connected by a network (transmission lines or communications circuitry) or the like.

2. Operations

The description now turns to the operations in this embodiment, with reference to the accompanying drawings.

2.1 Specification of Combination of Consecutive Maneuvers

With this embodiment, direction marks specifying the input of not one operation but a series of consecutive maneuvers (first to Nth operations) are displayed, and processing to evaluate the operation (performance) of the player is done.

Figures 3A, 3B:
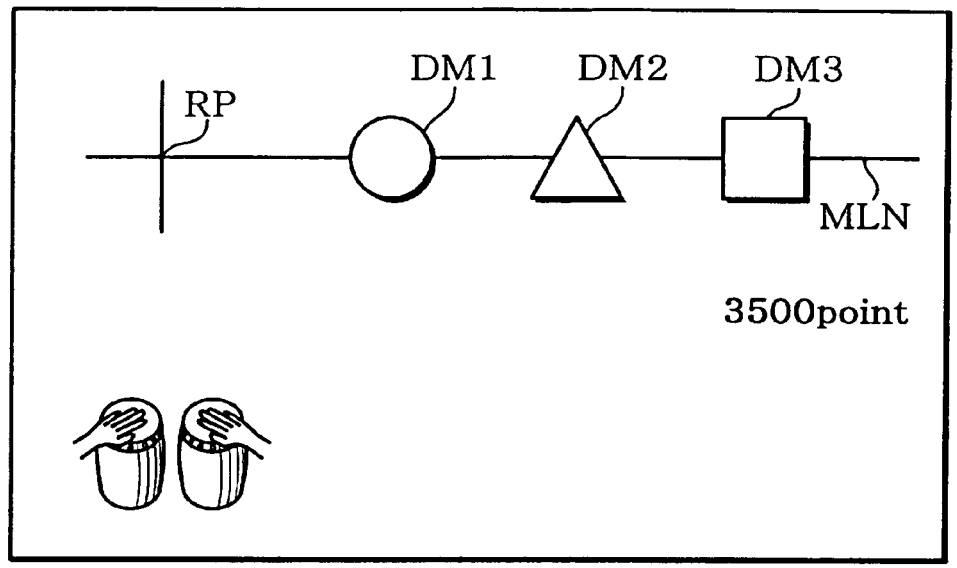
FIGS. 3A and 3B are illustrative of direction mark display control.

As shown in FIG. 3A by way of example, a circular direction mark DM1, a triangular direction mark DM2, and a square direction mark DM3 move from right to left of the screen along a line MLN. The player can obtain a score by operating (performing upon) the maneuver section 160 at a timing that matches (or substantially matches) a reference position (reference mark or reference line) RP for determining the timing of the direction marks DM1 to DM3.

More specifically, the direction mark DM1 on the leftmost side of FIG. 3A is a mark that specifies consecutive maneuvers (strikes) of the maneuver areas of the maneuver section 160, in the sequence A, B, A, B, as shown in FIG. 3B. The direction mark DM2 in the center is a mark that specifies consecutive maneuvers of the maneuver areas in the sequence A, B, C, D. The direction mark DM3 on the rightmost side is a mark that specifies consecutive maneuvers of the maneuver areas in the sequence A, C, A, C, A, C.

Therefore, the score is incremented if the player is successful in performing consecutive maneuvers on the maneuver areas in the sequence A, B, A, B, at the timing at which the direction mark DM1 reaches the RP. Similarly, the score is incremented if the player is successful in performing consecutive maneuvers on the maneuver areas in the sequence A, B, C, D at the timing at which DM2 reaches the RP, and in performing consecutive maneuvers on the maneuver areas in the sequence A, C, A, C, A, C at the timing at which DM3 reaches the RP.

If the player performs the consecutive maneuvers on the maneuver areas in accordance with the direction marks, maneuver sounds are also output in accordance with those consecutive maneuvers. For example, if consecutive maneuvers in the sequence A, B, A, B are performed on the maneuver areas in accordance with the specification of the direction mark DM1, a single group of sounds "pakasuka pakasuka" could be output from the sound output section. Similarly, if consecutive maneuvers in the sequence A, B, C, D are performed on the maneuver areas in accordance with the specification of the direction mark DM2, a single group of sounds "pakasuka pokaton" could be output from the sound output section. Note that a mark specifying only one operation (such as a mark specifying one operation of the maneuver areas A to D) could also be displayed with this embodiment, although this is not shown in FIG. 3A.

One method of specifying consecutive maneuvers that could be considered involves displaying first to fourth direction marks, which specify first to fourth operations, together in a direction mark display region (a region along the line MLN in FIG. 3A). However, there is a limit on the combined display of a large number of direction marks to specify a series of consecutive maneuvers, because of the restricted area of the direction mark display region.

In contrast thereto, this embodiment enables the specification of a series of consecutive maneuvers by a single mark, as shown by DM1 to DM3 in FIG. 3A. It is therefore possible to specify consecutive maneuvers with a direction mark that takes up substantially the same area, irrespective of the number of strikes in the consecutive maneuvers. In other words, the operations can be specified by direction marks that take up substantially the same area, regardless of whether each mark specifies just one operation, or four consecutive maneuvers as in DM1 and DM2, or six consecutive maneuvers as in DM3. It is therefore possible to request the player to perform a richer selection of operations, even when a limited area is used for the direction mark display region, making the music game more fun and also improving the performance interface environment for the player.

Note that FIG. 3A shows the direction marks DM1 to DM3 moving while the reference position RP stays still, but the configuration could equally well be such that the direction marks DM1 to DM3 stay still and the reference position RP moves. Alternatively, both the direction marks DM1 to DM3 and the reference position RP could be made to move closer to each other. In other words, the display control could be such that the relative positional relationship between the reference position (reference mark) RP that determines the timing and the direction marks DM1 to DM3 is made to change so that they approach each other.

Figure 4:
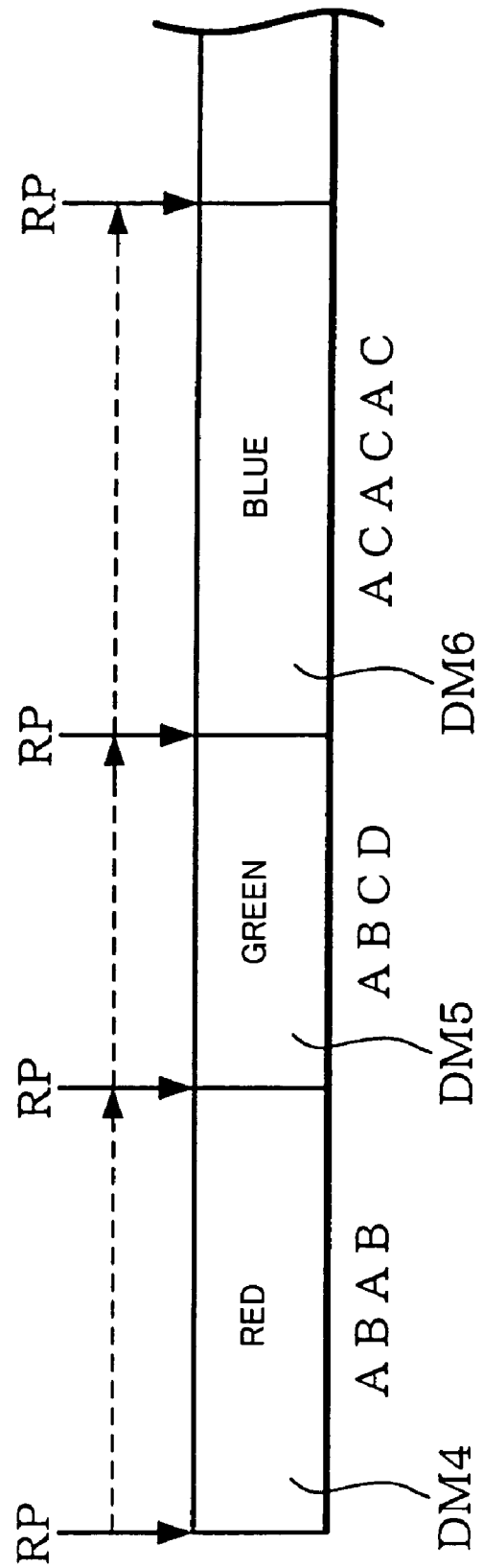
FIG. 4 is illustrative of moving of the reference position.

In an example shown in FIG. 4, the reference position (reference mark or reference line) RP moves as time elapses. In addition, direction marks DM4, DM5, and DM6 are in the shape of bands of specific colors. For example, a red band-shaped mark DM4 specifies consecutive maneuvers on the maneuver areas in the sequence A, B, A, B; a green band-shaped mark DM5 specifies consecutive maneuvers on the maneuver areas in the sequence A, B, C, D; and a blue band-shaped mark DM6 specifies consecutive maneuvers on the maneuver areas in the sequence A, C, A, C, A, C. When the reference position RP is at the position of the direction mark DM4, the player performs the consecutive maneuvers A, B, A, B; when RP is at the position of DM5, the player performs the consecutive maneuvers A, B, C, D; and when RP is at DM6, the player performs the consecutive maneuvers A, C, A, C, A, C.

Note that the states of the direction marks that are controlled in display can be in various different forms. For example, combinations of consecutive maneuvers could be specified by differences in the colors of the direction marks, as shown in FIG. 4.

Figure 5A:
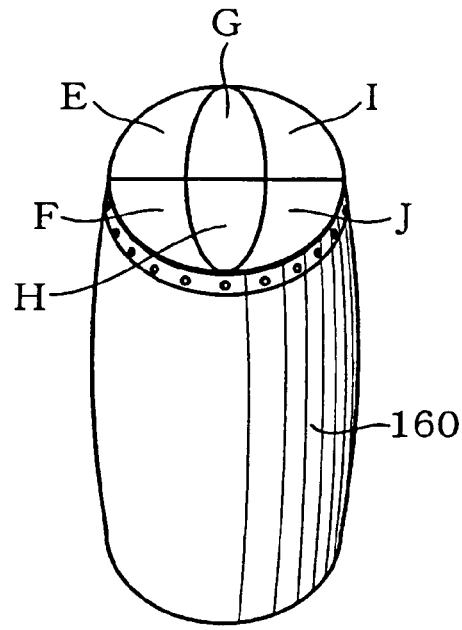
FIGS. 5A to 5D are illustrative of direction marks of various different shapes.
Figure 5B:
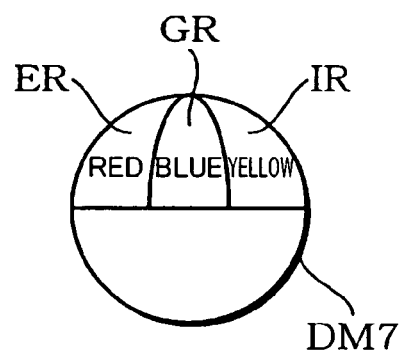
Figure 5C:
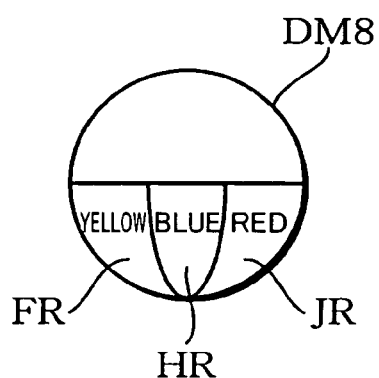

If the maneuver section 160 has a plurality of maneuver areas E, F, G, H, I, and J, as shown in FIG. 5A, direction marks could be used that have a plurality of direction regions corresponding in a one-to-one manner with these maneuver areas. For example, a direction mark DM7 shown in FIG. 5B has direction regions ER, GR, and IR corresponding in a one-to-one manner with the maneuver areas E, G, and I of FIG. 5A. This direction mark DM7 is a mark that specifies consecutive maneuvers in the sequence E, G, then I on the maneuver areas. Similarly, the direction mark DM8 shown in FIG. 5C has direction regions FR, HR, and JR corresponding in a one-to-one manner with the maneuver areas F, H, and J. This direction mark DM8 is a mark that specifies consecutive maneuvers in the sequence F, H, then J on the maneuver areas.

Note that the colors of the direction regions are designed to specify the order of the consecutive maneuvers. For example, since the direction regions ER and JR are read, they specify the first operation; since GR and HR are blue, they specify the second operation; and since IR and FR are yellow, they specify the third operation.

Figure 5D:
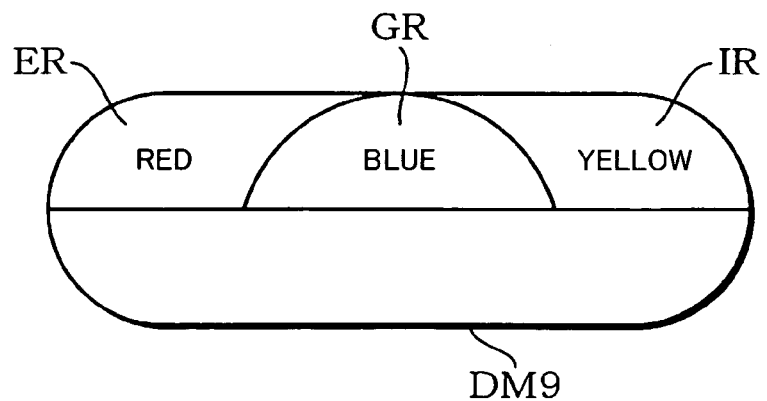

A direction mark DM9 shown in FIG. 5D is a mark that specifies three repeats of consecutive maneuvers in maneuver areas E, G, and I, by way of example. In other words, the player is to perform the operations of striking maneuver areas E, G, I, E, G, I, E, G, and I, in accordance with the specification of DM9. If the shape of the direction marks is used to specify the number of repeats of consecutive maneuvers, by means such as lengthening the shape of the direction mark sideways in this manner, it is possible to provide a suitable performance interface environment that is easy for the player to understand.

Note that the shapes and colors of the direction marks are not limited to those illustrated in FIGS. 3A to 5D and thus various different modifications thereof are possible.

2.2 Evaluation

The description now turns to evaluation in this embodiment. An example of table data used in evaluation in this embodiment is shown in FIG. 6. This table data contains combinations of consecutive maneuvers that are specified by direction marks, linked to the direction marks. In addition, evaluation data for each direction mark is linked to the corresponding direction mark. This evaluation data can include factors such as input-successful points, by way of example. Note that data for modifying maneuver sounds will be discussed later.

The input-successful points included within the evaluation data is data used as reference as to whether or not the player has succeeded in inputting the consecutive maneuvers. If the player's points exceed the input-successful points corresponding to each direction mark, the player is judged to have succeeded in performing the consecutive maneuvers specified by that direction mark. These input-successful points differ for each direction mark so that the input-successful points are lower as it becomes more difficult to input the consecutive maneuvers.

The determination of whether or not the player's points exceeds the input-successful points can be done by input success ratios that are a number of divisions of the input success maneuver with respect to the numbers of consecutive maneuvers specified by the direction marks. For example, the player's points increase as the input success ratio increases, increasing the probability that the input-successful points will be exceeded. Alternatively, the determination as to whether or not the player's points have exceeded the input-successful points could be based on the difference from the reference timing for each operation A, B, C, and D. For example, the player's points increase as the difference from the reference timing for each maneuver decreases, increasing the probability that they will exceed the input-successful points.

Figure 7:
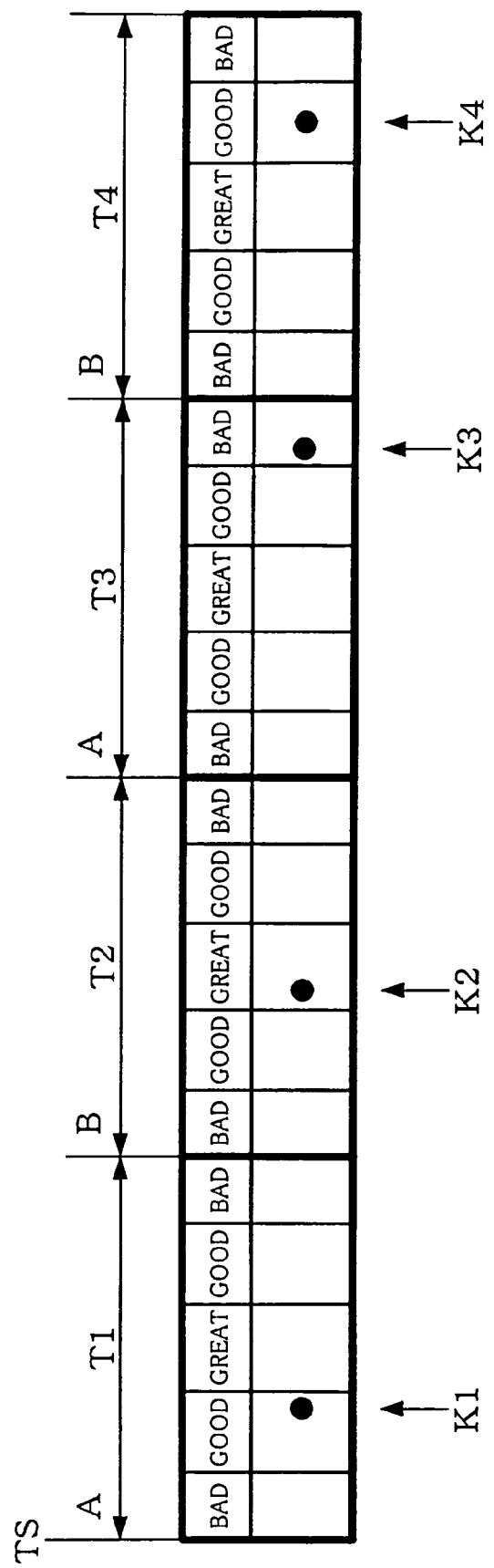
FIG. 7 shows reference timing data.

An example of reference timing data is shown in FIG. 7. Reference timing data can include times such as an input reception start time TS for the consecutive maneuvers and input reception times T1, T2, T3, and T4 for each operation. Note that the reference timing data could include input reception start times (input reception end times) for each operation, instead of the input reception time. Time intervals such as "GREAT", "GOOD", and "BAD" could be included within each input reception time in the reference timing data.

In FIG. 7, assume that the player operates the maneuver areas A, B, A, and B at the timings shown by K1, K2, K3, and K4. The evaluation of each operation of the maneuver areas A, B, A, and B is therefore "GOOD", "GREAT", "BAD", and "GOOD". The total value of the scores for "GOOD", "GREAT", "BAD", and "GOOD" therefore become the player's points, and the system judges whether or not these points exceed the input-successful points. Note that if any of the operations at K1 to K4 is outside the corresponding input reception times T1 to T4, that operation is determined to be a mistake. For example, whether or not the player's points exceed the input-successful points could be determined from reference to whether or not a few of the K1 to K2 maneuvers were successful.

2.3 Modification and Halting of Direction Marks

With this embodiment, direction mark display control can be executed in such a manner that the reference position for determining the timing is positioned within each direction mark at the timing of both the start and the end of the series of consecutive maneuvers performed by the player.

More specifically, each direction mark DM is moved with respect to the reference position RP (generally speaking: the relative positional relationship between DM and RP is changed). The player starts the consecutive maneuvers (A, B, A, B) specified by the direction mark, at the timing shown in FIG. 8A. In other words, the series of consecutive maneuvers starts at the timing at which the direction mark DM that specifies the consecutive maneuvers first matches the reference position RP for timing determination. The reference position RP is positioned within the direction mark at the start timing of these consecutive maneuvers.

Figure 8A:
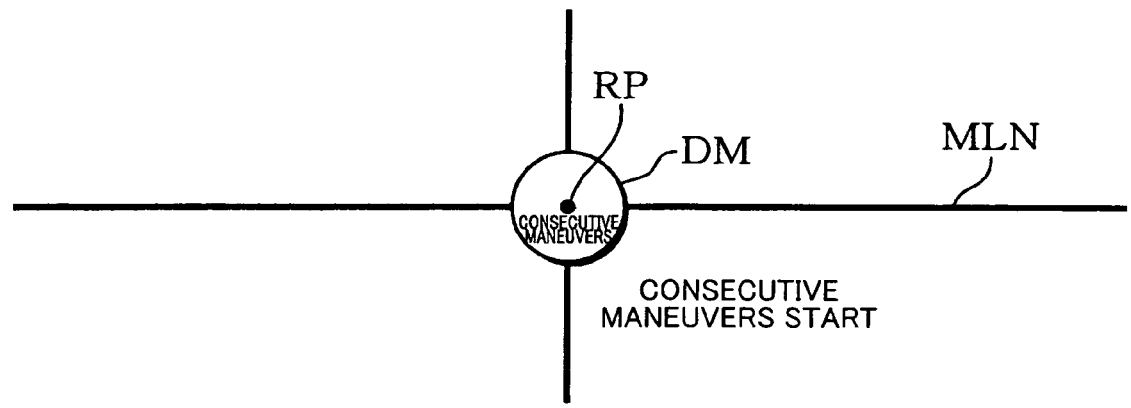
FIGS. 8A to 8C are illustrative of control of the display of direction marks during consecutive maneuvers.
Figure 8B:
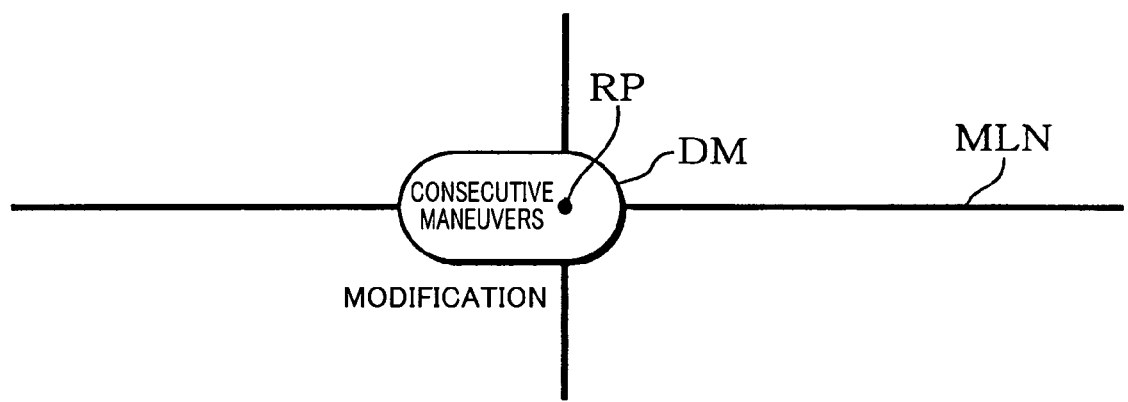

Intermediate timing between the start timing and end timing of the consecutive maneuvers is shown in FIG. 8B. At this timing too, the reference position RP is positioned within the direction mark. In other words, DM has been modified to enable the positioning of the RP in the DM. The consecutive maneuvers end at the timing shown in FIG. 8C. Even at the end timing of these consecutive maneuvers, the reference position RP is positioned within the direction mark.

Figure 8C:
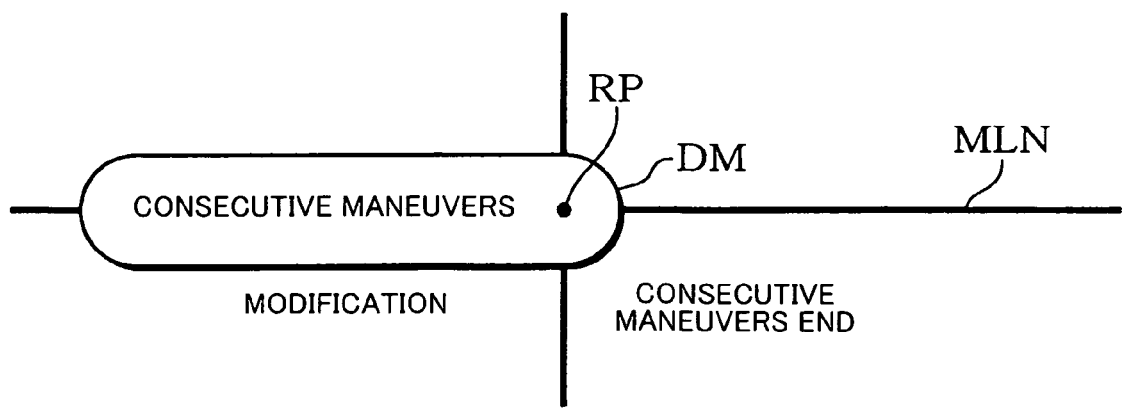

Making the shape of the direction mark as shown in FIGS. 8A to 8C ensures that the player can input consecutive maneuvers that require inputs at fixed times. The performance interface environment can be improved by making it simple to recognize the start and end timing of the consecutive maneuvers.

Note that the time elapsed from the start timing of the consecutive maneuvers and the end timing thereof changes the shape of the direction mark DM in FIGS. 8A to 8C. However, the modification is not limited thereto under the present invention, and thus the shape of the direction mark DM could be set from the start as shown in FIG. 8C, to enable the reference position RP to fit within the direction mark DM at both the start timing and the end timing.

The direction mark could also be halted during the input reception time for the consecutive maneuvers (from the input reception start time to the input reception end time).

Figure 9A:
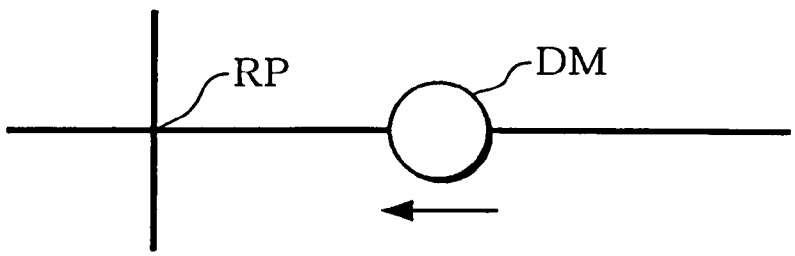
FIGS. 9A to 9D are illustrative of control of the display of direction marks during consecutive maneuvers.
Figure 9B:
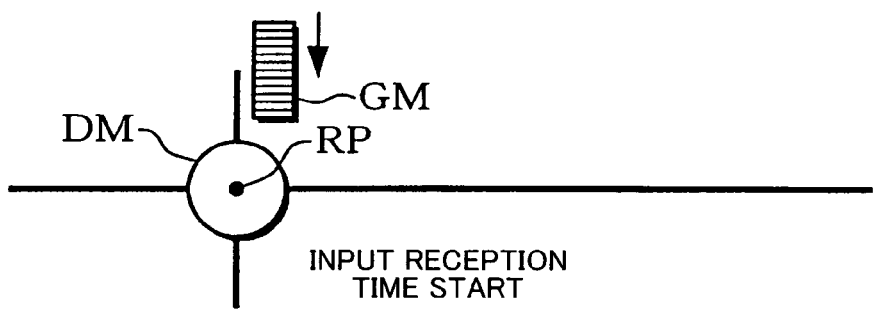
Figure 9C:
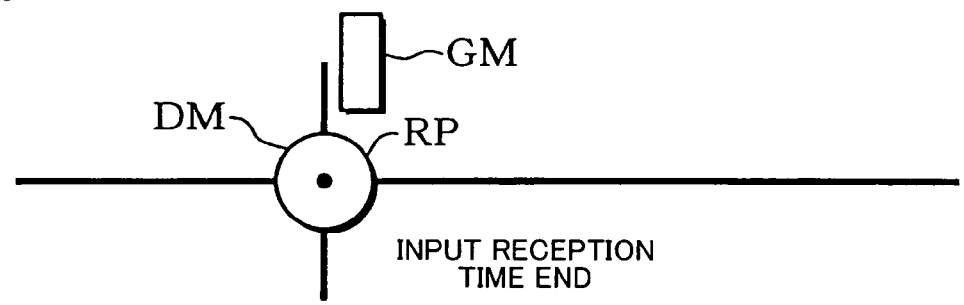
Figure 9D:
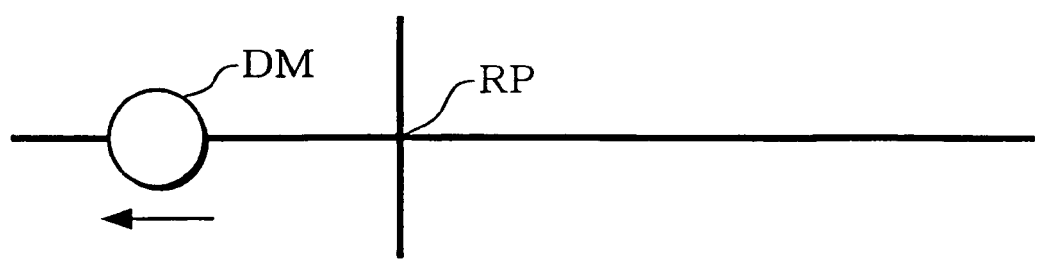

The direction mark DM is moved towards the reference position RP (the relative positional relationship of DM and RP is changed), as shown by way of example in FIG. 9A. When the direction mark DM reaches the position of the RP, as shown in FIG. 9B, the input reception time starts and the movement of the direction mark DM halts (or substantially halts). The position of the RP halts until the end of input reception time for the direction mark DM, as shown in FIG. 9C. At the end of the input reception time, the direction mark DM once again moves, as shown in FIG. 9D.

The control of the halting of the direction mark DM as shown in FIGS. 9A to 9D enables the player to input consecutive maneuvers that require a fixed time for input. It also enables ready recognition of the start timing and end timing for consecutive maneuvers, improving the performance interface environment.

A guide mark GM for informing the player of the input reception time for consecutive maneuvers is also displayed, as shown in FIGS. 9B and 9C. This guide mark GM is a mark that is intended to convey to the player at least one of the start, passage, and end of the input reception time for the consecutive maneuvers. As shown specifically in FIG. 9B, a timer bar of the guide mark GM starts to change at the start of input reception time and the timer bar of the guide mark GM increases (or decreases) as the input reception time elapses. When the input reception time ends, the timer bar of the guide mark GM has reached zero, which is the minimum value (or maximum value), as shown in FIG. 9C. This control over the display of the guide mark GM enables the player to recognize the start, passage, or end of the input reception time for the consecutive maneuvers in a simple manner, making it possible to improve the player's performance interface environment.

Note that the guide mark GM can be displayed linked to the direction mark DM for the consecutive maneuvers, as shown in FIGS. 9B and 9C. In other words, the guide mark GM appears in a location (vicinity) close to the direction mark. Alternatively, the guide mark GM could be displayed at a completely separate location from the direction mark DM (such as the location in which a score mark is displayed).

2.4 Specification of Repeats of Consecutive Maneuvers

With this embodiment, if the display of a direction mark is controlled to specify a plurality of repeats of a combination of consecutive maneuvers and the player inputs that plurality of repeats of the combination of consecutive maneuvers, a comparison determination can be done between the timings of the consecutive maneuvers that have been repeated a plurality of times and a reference timing.

Figure 10:
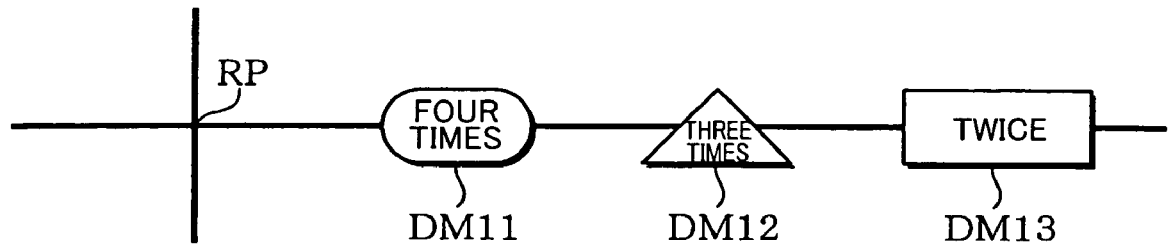
FIG. 10 is illustrative of control over the display of marks that specify repeats of the consecutive maneuvers.

For example, DM11 in FIG. 10 is a mark that specifies that the combination of consecutive maneuvers A, B, A, and B of FIG. 3B is repeated four times. DM12 is a mark that specifies that the combination of consecutive maneuvers A, B, C, and D is repeated three times. DM13 is a mark that specifies that the combination of consecutive maneuvers A, C, A, C, A, and C is repeated twice. The player therefore increments the score by performing the combination of consecutive maneuvers A, B, A, and B four times at the timing at which the direction mark DM11 reaches the RP. Similarly, the player further increments the score by performing the combination of consecutive maneuvers A, B, C, and D three times at the timing at which DM12 reaches the RP, and the combination of consecutive maneuvers A, C, A, C, A, and C twice at the timing at which DM13 reaches the RP.

This makes it possible to evaluate whether or not the input is successful for the number of repeats specified by the direction mark, irrespective of whether or not the player was successful the first time of the input of the consecutive maneuvers specified by the direction mark. This therefore makes it possible to ask the player to perform more advanced maneuvers, enabling an increase in the enjoyment of the game.

Note that the specification of the number of repeats is done as a text display in FIG. 10 (generally speaking: information that is added to the direction mark), but the number of repeats could be specified by a difference in color or brightness (generally speaking: the image state). For example, the direction mark could be set to red when the number of repeats is two, blue for three, and yellow for four.

In addition, the length of the direction mark can be set to correspond to the number of maneuvers included within the consecutive maneuvers or the number of repeats of the consecutive maneuvers. The length of the direction mark along the direction of movement could be made to increase with the number of maneuvers included within the consecutive maneuvers or the number of repeats of the consecutive maneuvers, by way of example.

2.5 Maneuver Sound Modification

With this embodiment, the details of maneuver sounds that are output in correspondence to the consecutive maneuvers that the player inputs can be modified in accordance with the game status. In this case, the game status is the current degree of game progress (the current game stage, the time elapsed since the start of the game, and the degree of success in the mission), the state of the game environment (the selected melody and the performance state), or the player's state (player's score and player's status parameters).

Figure 11A:
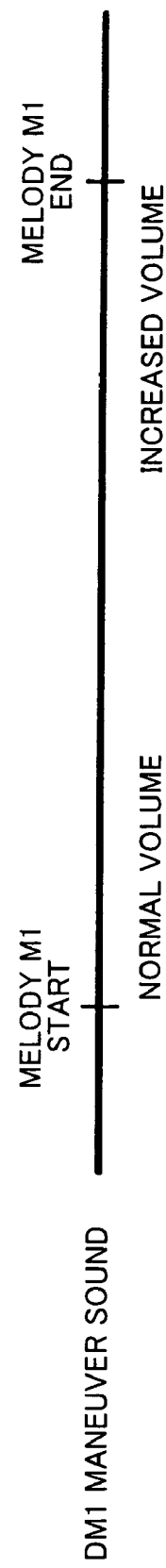
FIGS. 11A and 11B are illustrative of processing for modifying maneuver sounds.

Assume that a melody M1 has been selected and the game is in progress, as shown in FIG. 11A. In the first half of the melody M1, the sound volume of the maneuver sounds that are output when the consecutive maneuvers specified by the direction mark DM1 are input is normal volume. During the second half of the melody M1, on the other hand, the sound volume of the maneuver sounds that are output when the consecutive maneuvers specified by DM1 are input is increased. In other words, the details (such as sound volume, pitch, or tone) of the maneuver sounds that are output in correspondence with the consecutive maneuvers that the player inputs are modified in accordance with the degree of game progress. The control over the sound volume in this case can be implemented by using maneuver sound modification data that is stored linked to each direction mark, as shown in FIG. 6.

Figure 11B:
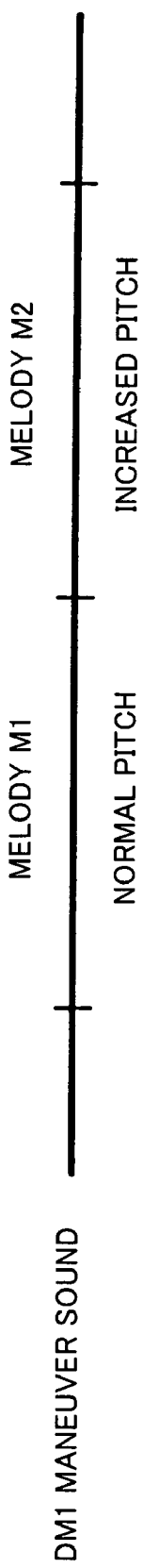

In the example shown in FIG. 11B, after the melody M1 has been selected and performed, another melody M2 is selected and performed. During the performance of the melody M1, the pitch of the maneuver sounds that are output at the input of the consecutive maneuvers specified by the direction mark DM1 is normal pitch. During the performance of the melody M2, on the other hand, the pitch of the maneuver sounds that are output at the input of the consecutive maneuvers specified by DM I is increased. In other words, the details (such as sound volume, pitch, or tone) of the maneuver sounds that are output in correspondence with the consecutive maneuvers that the player inputs are modified in accordance with the melody that is output during the game. The control over the pitch in this case can be implemented by using maneuver sound modification data that is stored linked to each direction mark, as shown in FIG. 6.

Modifying the maneuver sounds in accordance with the game status in this way makes it possible to heighten the feeling of tension in the player in the second half of the game (or melody), makes it possible to output maneuver sounds that have different intentions corresponding to the melody being played, and also enable an increase in the fun of the music game.

2.6 Modification of Consecutive Maneuvers Combination

With this embodiment, it is possible to modify the allocation of a combination of a plurality of maneuvers to a direction mark, in accordance with factors such as the player's selection.

Figure 12A:
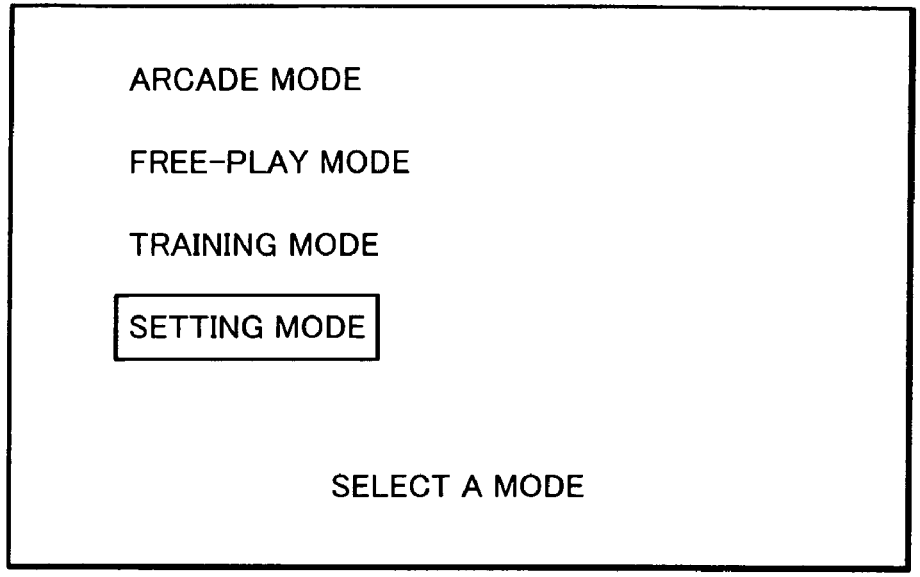
FIGS. 12A and 12B are illustrative of processing for modifying the allocation of consecutive maneuvers.

For example, assume that the mode selection screen shown in FIG. 12A is displayed at game start in accordance with this embodiment. This mode selection screen has an arcade mode that enables the player to play in accordance with the rules of an arcade game device, a free-play mode that enables the player to select a preferred melody repeatedly for playing, a training mode that enables the player to rehearse a performance, and a game setting mode for performing various game settings.

Figure 12B:
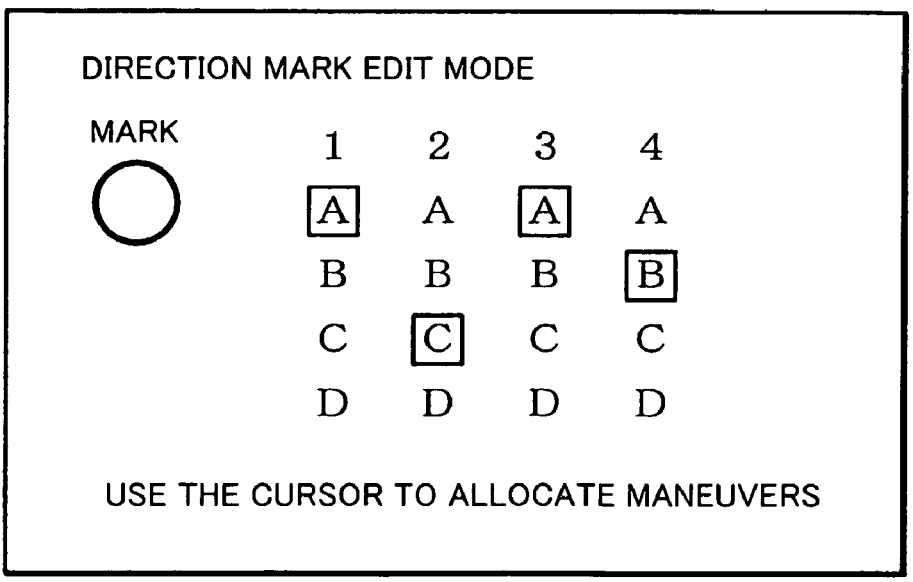

When the player selects the setting mode, a direction mark edit mode can also be selected, as shown in FIG. 12B. In this direction mark edit mode, the player can freely modify the allocation of combinations of consecutive maneuvers to the direction marks. For example, the allocation of consecutive maneuvers to the direction mark DM1 can be modified from the "A, B, A, B" of FIG. 3B to "A, B, A, B", as shown in FIG. 12B. After that, if the player succeeds in playing the maneuver areas in the sequence A, C, A, and B, when the direction mark DM1 reaches the RP, the player's score is incremented.

The amount of variety of the maneuver inputs to the music game is increased by enabling the player to freely modify the allocation of a combination of consecutive maneuvers to a direction mark in this manner, enabling a further increase in the fun of the music game.

2.7 Sound Input Maneuver

In the music game of this embodiment, the player can use the maneuver section 160 (such as a game controller) and the sound detection section 162 (such as a microphone), as shown in FIG. 1, to input a plurality of different types of maneuver. More specifically, the player enjoys the music game by performing striking maneuvers (as an example of maneuvers) and speech operations (as an example of sound input maneuvers).

However, an input device that can also pick up ambient sounds, such as a microphone, might also pick up sounds that the player does not intend. If the game-playing environment is a noisy location, therefore, it can be difficult to detect input operations accurately. In particular, if a comparatively large maneuver sound such as that of a striking maneuver occurs, the strike maneuver sound is detected by the microphone and it is possible for an erroneous input operation to be detected.

If an operation of the maneuver section and a sound input maneuver (such as a speech operation or a time beat) are input overlapping in this embodiment, the operation of the maneuver section has priority.

Figure 13:
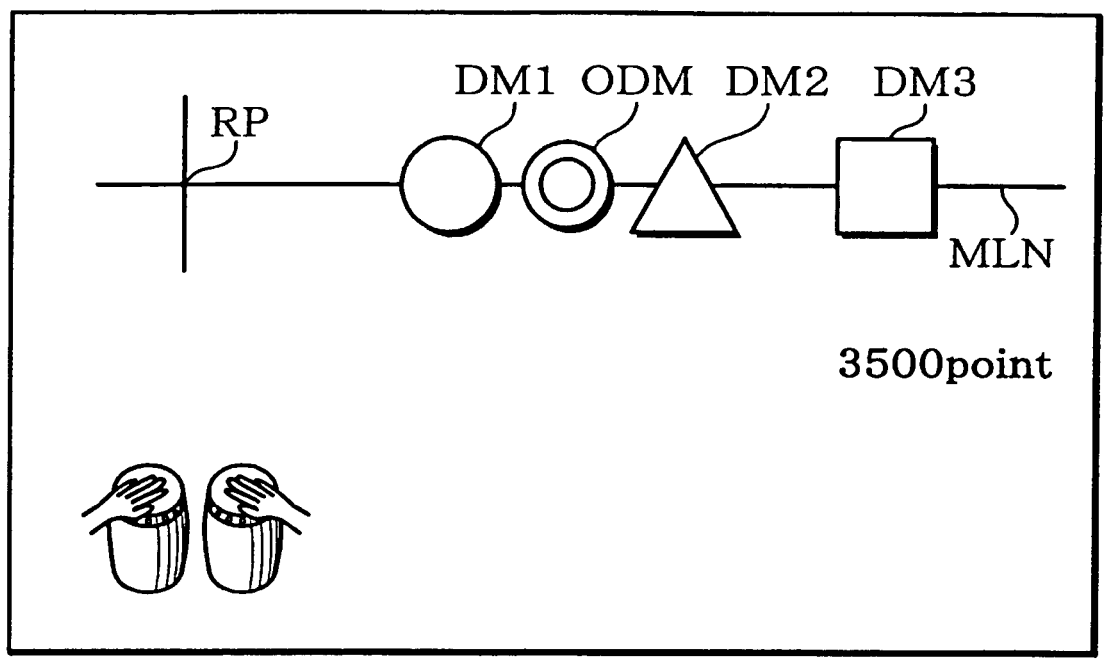
FIG. 13 is illustrative of the control of the display of maneuver input and sound input direction marks.

The game screen shown by way of example in FIG. 13 displays maneuver input direction marks DM1 to DM3 (first direction marks), which specify that the player performs operations using the maneuver section, and a sound input direction mark ODM (a second direction mark), which specifies that the player performs a sound input maneuver to be detected by the sound detection section. More specifically, the display linked to the reproduction of tune data is controlled in such a manner that the maneuver input direction marks DM1 to DM3 and the sound input direction mark ODM of a substantially circular shape move along the line (score) MLN towards the reference position RP (reference mark).

In this case, the maneuver input direction marks DM1 to DM3 and the sound input direction mark ODM are displayed in a state in which the player can identify the specifications thereof. They could have different shapes, patterns, or colors, by way of example. The player observes the state of movement of the maneuver input direction marks DM1 to DM3 and the sound input direction mark ODM through the game screen displayed on the display section. The player can strike the maneuver section areas at the timing at which the maneuver input direction marks DM1 to DM3 pass the reference position RP (overlap timing), to obtain a score. Similarly, the player can beat time at the timing at which the sound input direction mark ODM passes the reference position RP (generally speaking: perform a sound input maneuver), the sound of that time beat is detected by the sound detection section (microphone), and the player obtains a score.

With this embodiment, the system determines whether or not the operation of the maneuver section and the sound input maneuver detected by the sound detection section are valid (whether or not these maneuvers are to be used in the game computations). More specifically, if the operation of the maneuver section (striking maneuver) and the sound input maneuver (time beat) overlap within the unit determination period (generally speaking: a given period, hereinafter the same), the system determines that only the operation of the maneuver section is valid. If the operation of the maneuver section and the sound input maneuver are outside the unit determination period, on the other hand, the system determines that each operation is valid.

Figure 14A:
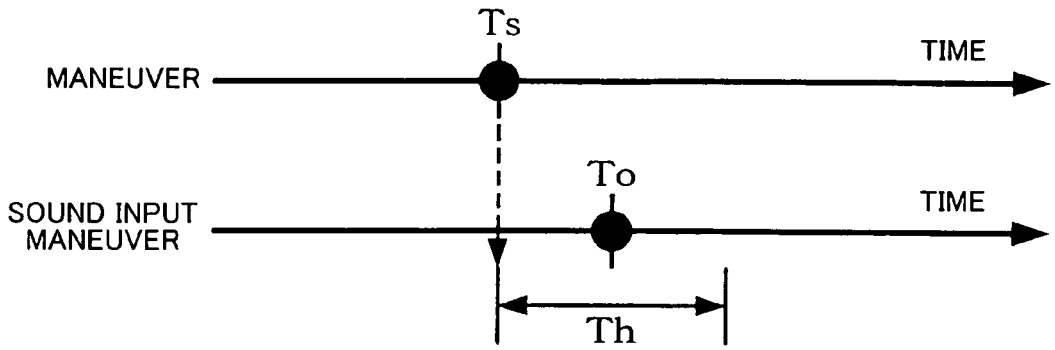
FIG. 14A to 14D are illustrative of the first and second determination.
Figure 14B:
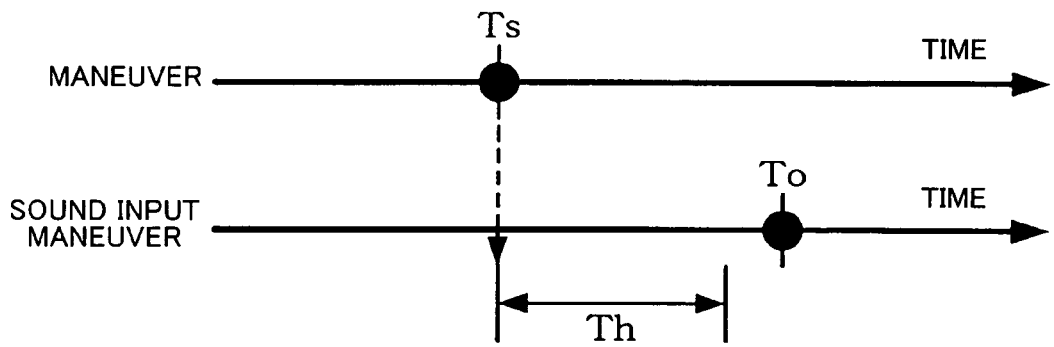

A first determination in accordance with this embodiment is shown in FIGS. 14A and 14B. As shown by way of example in FIGS. 14A and 14B, a given period (such as a few seconds or a few frames) from a timing Ts at which the operation of the maneuver section has been received (or a timing To at which a sound input maneuver has been received) is determined to be a unit determination period Th.

As shown specifically in FIG. 14A, if it is judged that the operation of the maneuver section and the sound input maneuver overlap within the unit determination period Th, it is highly probable that the sound detection section has detected the maneuver sound of the maneuver section erroneously. In such a case, therefore, the system determines that the operation of the maneuver section (the maneuver data) is the valid data. If the operation of the maneuver section is received at the timing Ts, on the other hand, as shown in FIG. 14B after the unit determination period Th has elapsed, the system determines that both operations were valid when the sound input maneuver is received at the timing To. This makes it possible to prevent the sound detection section from erroneously detecting the operational sounds of the maneuver section, making it possible to prevent a situation in which it is used in the evaluation of the player's operation or the evaluation of the sound input.

Figure 14C:
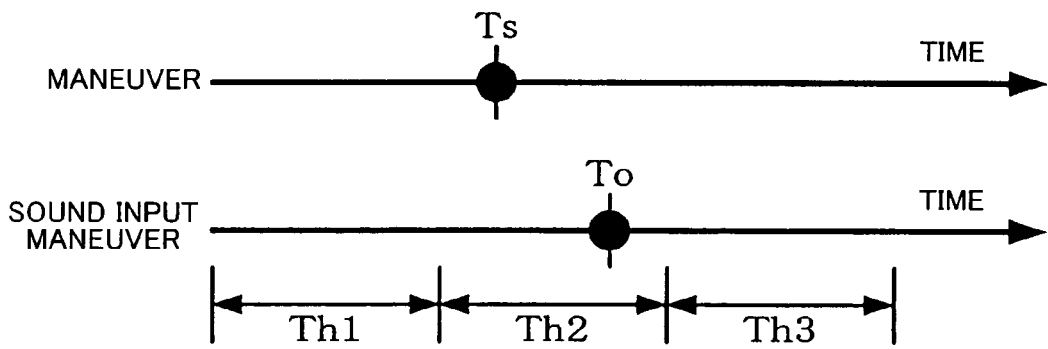
Figure 14D:
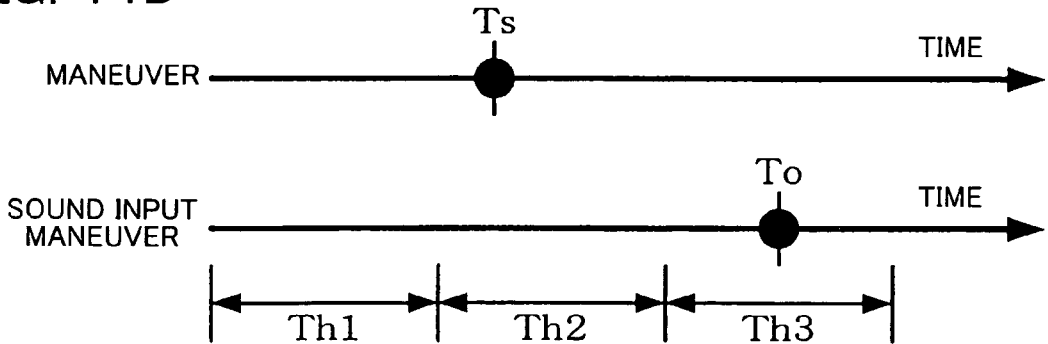

A second determination in this embodiment is shown in FIGS. 14C and 14D. With the second determination, unit determination periods Th1, Th2, . . . Thn are set beforehand. If the operation of the maneuver section and the sound input maneuver overlap within any of these unit determination periods, the system determines that the operation of the maneuver section is the valid data. If the timings of the operation of the maneuver section and the sound input maneuver are in different unit determination periods, the system determines that each operation is valid.

More specifically, if the timing Ts of the operation of the maneuver section and the timing To of the sound input maneuver are within the same unit determination period Th2, as shown in FIG. 14C, the system determines that the operation of the maneuver section has priority and that is the valid data. If the timing Ts of the operation of the maneuver section is within the unit determination period Th2 and the timing To of the sound input maneuver is within the unit determination period Th3, on the other hand, the system determines that each operation is valid. This makes it possible to prevent the sound detection section from erroneously detecting the operational sounds of the maneuver section, making it possible to prevent a situation in which it is used in the evaluation of the player's operation or the evaluation of the sound input.

Note that during the determination of the sound input maneuver, the configuration could be such that the system judges whether or not the sound volume detected by the sound detection section in response to the sound input maneuver exceeds a reference sound volume level, and determines that the sound input maneuver is valid only when it is judges to exceed the reference sound volume level. This makes it possible to implement accurate performance evaluation by determining that some sound input maneuvers are invalid, even when the noise such as ambient noise has been detected by the sound detection section. Furthermore, if this reference sound volume level is used in the input determination, it is preferable the reference sound volume level can be adjusted, either automatically or freely by the player, in accordance with the surrounding noise levels. If the reference sound volume level is set too low when the music game is played in an environment in which noise occurs in the vicinity, there is a danger that such noise would be detected as a sound input maneuver. In such a case, setting the reference sound volume level higher would make it possible to accurately detect sounds generated by the player's sound input maneuvers.

Note that the direction marks DM1 to DM3 that specify operations of the maneuver section and the direction mark ODM that specifies a sound input maneuver are shown as separate marks in FIG. 13, but the control over the display of direction marks of this embodiment is not limited thereto. For example, one maneuver within a series of consecutive maneuvers specified by a direction mark could be a sound input maneuver. The maneuvers represented by A, B, C, or D in FIG. 3B could be sound input maneuvers to be detected by the sound detection section, by way of example.

3. Processing

Figure 15:
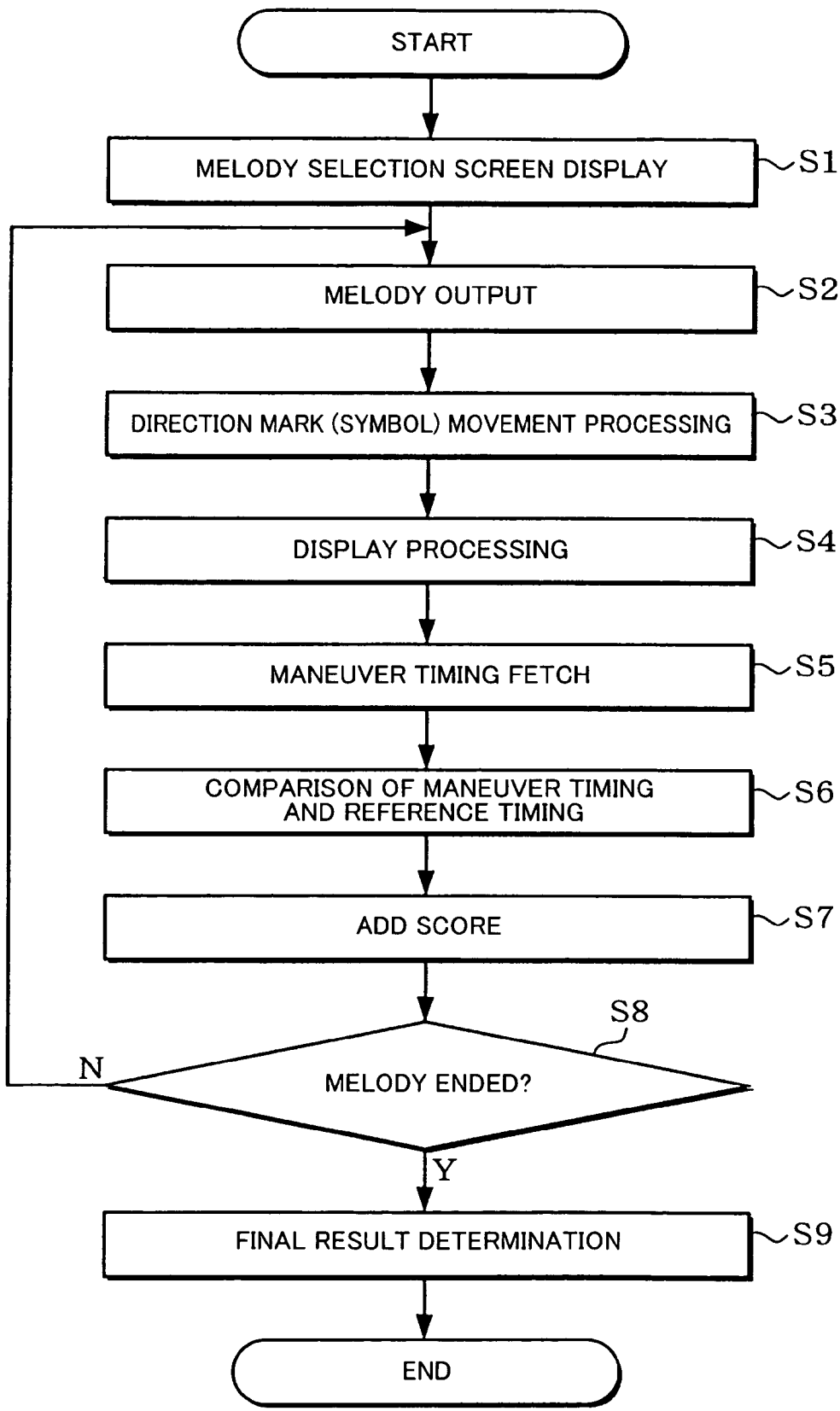
FIG. 15 is a flowchart of an example of the processing according to one embodiment of the present invention.

The description now turns to details of the processing in this embodiment, with reference to the flowchart of FIG. 15.

First of all, the system executes processing to display a screen that enables the player to select a melody for the music game (step S1). It then executes processing to output the music for the melody selected by the player (step S2).

The system then performs movement processing for the direction marks (reference symbols) described with reference to FIG. 3A, together with display processing therefore (steps S3 and S4). In other words, it moves the direction marks along the line at a given movement speed. It also reads out image data for each direction mark (such as a direction mark specifying a combination of a series of consecutive maneuvers by a single mark) from the direction mark storage section and displays that direction mark image data at the position determined by the movement processing of step S3. In such a case, the direction mark is displayed by the display control described with reference to FIGS. 3A to 14D. Note that the reference position could be made to move towards the direction marks during the movement processing of step S3.

The system then fetches the maneuver timing (step S5). In other words, when the player has operated the maneuver section in accordance with the specifications of the direction marks displayed by the movement processing and display processing of steps S3 and S4, data (maneuver data) of the maneuver timing that was input by the player is sampled every frame, by way of example, and held in a storage buffer for maneuver data.

The system executes a comparison determination between the thus-fetched maneuver timing and reference timing (step S6). In other words, it executes a comparison determination on the maneuver timing data (consecutive maneuvers timing data) held in the storage buffer and reference timing data stored in the reference timing data storage section. More specifically, the comparison determination processing is based on the evaluation data described with reference to FIGS. 6 and 7 and reference timing data. The system also executes output processing on maneuver sounds corresponding to the consecutive maneuvers.

The system performs addition processing on the player's score (step S7). More specifically, the system increments the player's score by a score corresponding to the evaluation of the player's maneuver, from the comparison determination of step S6. In this case, the calculation and addition of the player's score is based on the evaluation described with reference to FIGS. 6 and 7.

The system then judges whether or not the melody has ended (step S8) and, if it has not ended, the flow returns to step S2. If the melody has ended, the system determines and displays the player's final game result (step S9).

Any term (such as maneuver areas A to J, a percussion instrument, and color/brightness) cited with a different term having broader or the same meaning (such as a plurality of maneuver areas, a musical instrument, and image state) at least once in this specification and drawings can be replaced by the different term in any place in this specification and drawings.

Part of requirements of any claim of the present invention could be omitted from a dependent claim which depends on that claim. Moreover, part of requirements of any independent claim of the present invention could be made to depend on any other independent claim.

When a maneuver area is specified for an operation by a direction mark, the color of the maneuver section area could change or the maneuver area could be made to flash, by way of example. When the specification is to manipulate the maneuver areas E, G, and I in accordance with the sequence of direction region ER, GR, and IR, such as by the direction mark DM7 of FIG. 5B by way of example, the colors of the portions of the maneuver areas of FIG. 5A could change in the sequence of E, G, then I, or illumination devices could be used to flash them in the sequence of E, G, then I. These color changes or flashing displays can be implemented by sending data specifying the color changes or flashing from the main unit 10 to the maneuver section 160.

The present invention is suited to a music game in which a maneuver section in the shape of a percussion instrument is used, as shown in FIG. 1, but it can also be applied to music games using other musical instruments. It can also be applied to music games in which musical instruments are not used.

The present invention can be applied to various game systems (image generation systems) such as arcade game systems, domestic game systems, large-scale attractions in which many players can participate, simulators, multimedia terminals, and mobile phones.

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A computer readable storage medium bearing a program for a music game which a player plays by operating a maneuver section, the program causing a computer to function as:
   a direction mark storage section which stores image data of a direction mark that specifies a maneuver that the player is to perform, using the maneuver section;
   a display controller which controls display of a plurality of display objects including the direction mark, based on the image data of the direction mark;
   a timing fetch section which fetches a maneuver timing when the player has operated the maneuver section in accordance with a direction given by the direction mark; and
   an evaluation section which evaluates performance of the player, based on a result of comparison between the fetched maneuver timing and a reference timing,
   wherein the display controller displays the direction mark to specify a combination of a series of consecutive maneuvers to be input by the player, by a single mark; and
   wherein the display controller changes the relative positional relationship between the direction mark and a reference position for timing determination to bring the direction mark and the reference position closer.

2. The program as defined in claim 1,
   wherein, when the player has input a series of consecutive maneuvers in accordance with the direction of the direction mark, the evaluation section compares a timing of the series of the consecutive maneuvers with a reference timing, to evaluate the performance of the player.

3. The program as defined in claim 1, wherein:
   the display controller displays a first direction mark to specify input of a first series of consecutive maneuvers, and displays a second direction mark that differs from the first direction mark to specify input of a second series of consecutive maneuvers; and
   when the player has input the first series of consecutive maneuvers in accordance with the first direction mark, the evaluation section compares the timing of the first series of consecutive maneuvers with a first reference timing, to evaluate the performance of the player, and when the player has input the second series of consecutive maneuvers in accordance with the second direction mark, the evaluation section compares the timing of the second series of consecutive maneuvers with a second reference timing, to evaluate the performance of the player.

4. The program as defined in claim 1,
   wherein the display controller controls the display of the direction mark in such a manner that the reference position for timing determination is positioned within the direction mark at both a timing at which a series of consecutive maneuvers specified by the direction mark is to start and a timing at which the series of consecutive maneuvers is to end.

5. The program as defined in claim 1,
   wherein the display controller halts the movement of at least one of the reference position and the direction mark in an input reception time in which input of a series of consecutive maneuvers specified by the direction mark is received.

6. The program as defined in claim 5,
   wherein the display controller displays a guide mark which is used to inform the player of the input reception time.

7. The program as defined in claim 1, wherein:
   the display controller displays the direction mark so as to specify a plurality of repeats of a series of consecutive maneuvers; and
   when the player has input a plurality of repeats of a series of consecutive maneuvers in accordance with the direction mark, the evaluation section compares a timing of the consecutive maneuvers performed a plurality of times with the reference timing.

8. The program as defined in claim 1, causing the computer to further function as:
   a maneuver sound modification section which modifies a maneuver sound that is output in response to consecutive maneuvers that the player has input, in accordance with a game status.

9. The program as defined in claim 8,
   wherein the maneuver sound modification section modifies the maneuver sound that is output in response to consecutive maneuvers that the player has input, based on at least one of the degree of game progress and a melody that is selected in the game.

10. The program as defined in claim 1, causing the computer to further function as:
an allocation modification section which performs processing to modify a combination of consecutive maneuvers that is allocated to the direction mark.

11. The program as defined in claim 1, wherein:
the display controller displays a first direction mark that specifies to the player a maneuver to be performed by using the maneuver section and a second direction mark that specifies to the player a sound input maneuver to be detected by a sound detection section; and
when the timing fetch section judges that the player has operated both the maneuver section and the sound input maneuver within a given period, the timing fetch section determines that the operation of the maneuver section is valid and fetches a maneuver timing of the operation of the maneuver section, but when the timing fetch section judges that the player has not operated the maneuver section and the sound input maneuver within the same period, the timing fetch section determines that both the operation of the maneuver section and the sound input maneuver are valid and fetches maneuver timings of both the operation of the maneuver section and the sound input maneuver.

12. A computer readable storage medium bearing a program for a percussion-instrument game in which a player strikes percussion-instrument-shaped controller, the program causing a computer to function as:
a direction mark storage section which stores image data of a direction mark that specifies a striking maneuver that the player is to perform, using a percussion-instrument-shaped controller;
a display controller which controls display of a plurality of display objects including the direction mark, based on the image data of the direction mark;
a timing fetch section which fetches a strike timing when the player has struck the percussion-instrument-shaped controller in accordance with a direction given by the direction mark; and
an evaluation section which evaluates performance of the player, based on a result of comparison between the fetched strike timing and a reference timing,
wherein the display controller displays the direction mark to specify a combination of a series of consecutive maneuvers to be input by the player, by a single mark; and
wherein the display controller changes the relative positional relationship between the direction mark and a reference position for timing determination to bring the direction mark and the reference position closer.

13. A game system for a music game which a player plays by operating a maneuver section, the game system comprising:
a direction mark storage section which stores image data of a direction mark that specifies a maneuver that the player is to perform, using the maneuver section;
a display controller which controls display of a plurality of display objects including the direction mark, based on the image data of the direction mark;
a timing fetch section which fetches a maneuver timing when the player has operated the maneuver section in accordance with a direction given by the direction mark; and
an evaluation section which evaluates performance of the player, based on a result of comparison between the fetched maneuver timing and a reference timing,
wherein the display controller displays the direction mark to specify a combination of a series of consecutive maneuvers to be input by the player, by a single mark; and
wherein the display controller changes the relative positional relationship between the direction mark and a reference position for timing determination to bring the direction mark and the reference position closer.

14. A game system for a percussion-instrument game in which a player strikes a percussion-instrument-shaped controller, the game system comprising:
a direction mark storage section which stores image data of a direction mark that specifies a striking maneuver that the player is to perform, using a percussion-instrument-shaped controller;
a display controller which controls display of a plurality of display objects including the direction mark, based on the image data of the direction mark;
a timing fetch section which fetches a strike timing when the player has struck the percussion-instrument-shaped controller in accordance with a direction given by the direction mark; and
an evaluation section which evaluates performance of the player, based on a result of comparison between the fetched strike timing and a reference timing,
wherein the display controller displays the direction mark to specify a combination of a series of consecutive maneuvers to be input by the player, by a single mark; and
wherein the display controller changes the relative positional relationship between the direction mark and a reference position for timing determination to bring the direction mark and the reference position closer.

15. A method of controlling a game system for a music game which a player plays by operating a maneuver section, the method comprising:
storing image data of a direction mark that specifies a maneuver that the player is to perform, using the maneuver section, in a direction mark storage section;
controlling display of a plurality of display objects including the direction mark, based on the image data of the direction mark;
fetching a maneuver timing when the player has operated the maneuver section in accordance with a direction given by the direction mark;
evaluating performance of the player, based on a result of comparison between the fetched maneuver timing and a reference timing;
displaying the direction mark to specify a combination of a series of consecutive maneuvers to be input by the player, by a single mark; and
changing the relative positional relationship between the direction mark and a reference position for timing determination to bring the direction mark and the reference position closer.

16. A method of controlling a game system for a percussion-instrument game in which a player strikes a percussion-instrument-shaped controller, the method comprising:
storing image data of a direction mark that specifies a striking maneuver that the player is to perform, using a percussion-instrument-shaped controller, in a direction mark storage section;

controlling display of a plurality of display objects including the direction mark, based on the image data of the direction mark;

fetching a strike timing when the player has struck the percussion-instrument-shaped controller in accordance with a direction given by the direction mark;

evaluating performance of the player, based on a result of comparison between the fetched strike timing and a reference timing;

displaying the direction mark to specify a combination of a series of consecutive maneuvers to be input by the player, by a single mark; and changing the relative positional relationship between the direction mark and a reference position for timing determination to bring the direction mark and the reference position closer.

* * * * *